US012719590B2

(12) United States Patent
Cho et al.

(10) Patent No.: US 12,719,590 B2
(45) Date of Patent: Aug. 25, 2026

(54) ANTENNA MODULE FOR GENERATING SELF TESTING SIGNAL AND ELECTRONIC DEVICE USING IT

(71) Applicant: SAMSUNG ELECTRONICS CO., LTD., Suwon-si (KR)

(72) Inventors: Namjun Cho, Suwon-si (KR); Sejeong Oh, Suwon-si (KR); Hyoseok Na, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 534 days.

(21) Appl. No.: 18/108,215

(22) Filed: Feb. 10, 2023

(65) Prior Publication Data

US 2023/0198638 A1 Jun. 22, 2023

Related U.S. Application Data

(63) Continuation of application No. PCT/KR2021/014026, filed on Oct. 12, 2021.

(30) Foreign Application Priority Data

Oct. 12, 2020 (KR) ........................ 10-2020-0131358

(51) Int. Cl.
*H04B 17/14* (2015.01)
*H04B 1/00* (2006.01)
(Continued)

(52) U.S. Cl.
CPC ............. *H04B 17/14* (2015.01); *H04B 1/006* (2013.01); *H04B 1/0096* (2013.01); *H04B 17/101* (2015.01); *H04B 17/19* (2015.01)

(58) Field of Classification Search
CPC ....... H04B 17/14; H04B 17/19; H04B 1/0096
See application file for complete search history.

(56) References Cited

U.S. PATENT DOCUMENTS 6,081,700 A 6/2000 Salvi et al.
7,181,168 B2 2/2007 Grant et al.
(Continued)

FOREIGN PATENT DOCUMENTS

CN 110018446 7/2019
KR 10-2019-0142827 12/2019
(Continued)

OTHER PUBLICATIONS

International Search Report mailed Feb. 4, 2022 in PCT application PCT/KR2021/014026, 6 pages.
(Continued)

*Primary Examiner* — Jinsong Hu
(74) *Attorney, Agent, or Firm* — Nixon & Vanderhye P.C.

(57) ABSTRACT

The present disclosure relates to a 5th (5G) generation or pre-5G communication system for supporting a higher data transmission rate beyond a 4th (4G) generation communication system such as long term evolution (LTE). According to various embodiments of the present disclosure, an antenna module may include at least one transmission chain including a first mixer configured to up-convert a transmission signal into a radio frequency band; at least one frequency generator configured to generate at least one signal; and at least one switch configured to receive the at least one signal generated from the frequency generator, and to selectively deliver the at least one signal to the first mixer, the antenna element, the transmission chain, and the frequency generator.

20 Claims, 15 Drawing Sheets

(51) Int. Cl.
*H04B 17/10* (2015.01)
*H04B 17/19* (2015.01)

(56) References Cited

U.S. PATENT DOCUMENTS 8,606,193 B2 12/2013 Ko et al.
9,331,797 B2 5/2016 Kordik et al.
9,485,036 B2 11/2016 Kordik et al.
9,490,548 B2 11/2016 Weissman et al.
9,692,428 B2 6/2017 Chakraborty et al.
9,960,864 B2 5/2018 Mow et al.
10,014,964 B2 * 7/2018 Nardozza ............... H04B 17/19
10,284,236 B1 5/2019 Trotta
10,554,243 B2 * 2/2020 Bai .......................... H04B 1/44
10,886,623 B2 1/2021 Son et al.
11,158,944 B2 10/2021 Schrattenecker et al.
11,177,567 B2 * 11/2021 Khalil .................... H01Q 3/267
2015/0043555 A1 2/2015 Popescu et al.
2015/0372710 A1 12/2015 Longhurst
2018/0287651 A1 10/2018 Fernando et al.
2018/0316082 A1 * 11/2018 Keller, III ................ H01Q 1/38
2019/0089471 A1 3/2019 Frydman et al.
2019/0364239 A1 * 11/2019 Azad .................... H01Q 9/0435
2020/0136732 A1 * 4/2020 Verma ................ H04B 17/0085
2021/0218430 A1 * 7/2021 Han ......................... H04B 1/18

FOREIGN PATENT DOCUMENTS

WO WO-2015062761 A1 * 5/2015 ........... H04B 17/221
WO 2020/139371 7/2020

OTHER PUBLICATIONS

Written Opinion of the ISA mailed Feb. 4, 2022 in PCT application PCT/KR2021/014026, 6 pages.
Korean Notice of Patent Grant dated Feb. 9, 2026 for KR Application No. KR10-2020-0131358.
Korean Office Action dated Aug. 19, 2025 for KR Application No. 10-2020-0131358.

* cited by examiner

ANTENNA MODULE FOR GENERATING SELF TESTING SIGNAL AND ELECTRONIC DEVICE USING IT

CROSS-REFERENCE TO RELATED APPLICATIONS

This application is a continuation of International Application No. PCT/KR2021/014026 designating the United States, filed on Oct. 12, 2021, in the Korean Intellectual Property Receiving Office and claiming priority to Korean Patent Application No. 10-2020-0131358, filed on Oct. 12, 2020, in the Korean Intellectual Property Office, the disclosures of which are incorporated by reference herein in their entireties.

BACKGROUND

Field

The disclosure relates to an apparatus and a method for supporting self-testing of an antenna module to be applied to an electronic device which supports a high frequency band.

Description of Related Art

A next generation (e.g., $5^{th}$-generation or pre-5G) communication system (hereafter, referred to as a '5G communication system) may be realized in a high frequency band (e.g., millimeter wave (mmWave)), to achieve a high data rate. For example, to mitigate a path loss and to extend a propagation distance of the high frequency band, the 5G communication system may adopt beamforming, massive multiple input multiple output (MIMO), full dimensional (FD)-MIMO, array antenna, analog beam-forming, and large scale antenna techniques.

The 5G communication system may be based on wireless communication of the high frequency band (e.g., mmWave, over 20 GHz) to achieve the high data rate compared to a 4G communication system. For example, the 5G communication system supporting the high frequency (mmWave) band has adopted a new front end structure which integrates an antenna and a transceiver in one module.

To achieve a high data rate than a 4G communication system, a 5G communication system may provide wireless communications by a high frequency (mmW) band (e.g., 3 GHz~100 GHz) signal of short wavelength and strong linearity. The 5G communication system may apply a front end structure which integrates a transceiver and an antenna in one module to support the high frequency band.

The 5G communication system which propagates a high frequency signal through a free-space, may have higher attenuation characteristics (e.g., about 20-30 dB attenuation) than a communication system (e.g., the 4G communication system) which uses a relatively low frequency band (within 7.125 GHz). To address service area reduction, the 5G communication system may transmit/receive a phase-aligned signal through a plurality of antenna elements arranged in an array form.

The 5G communication system may use a radiation verification system to compensate radio frequency (RF) characteristics of the high frequency (mmWave) module, and to test non-defective goods and defective goods. Yet, such a system requires an expensive equipment to install a far-field chamber inside the module or to apply the 5G signal, and it may not be an efficient scheme in terms of cost or time.

SUMMARY

Embodiments of the disclosure provide an antenna module for supporting self-testing of a radio signal and an operating method therefor in an electronic device which supports wireless communication of a high frequency band.

According to various example embodiments of the present disclosure, an antenna module may include at least one transmission chain including: a first mixer configured to up-convert a transmission signal into a radio frequency band; at least one frequency generator configured to generate at least one signal; and at least one switch configured to receive the at least one signal generated from the frequency generator, and to selectively deliver the at least one signal to the first mixer, the antenna module, the transmission chain, and the frequency generator.

According to various example embodiments of the present disclosure, an electronic device may include an antenna element including: a first feed point; at least one transmission chain electrically coupling with the first feed point, and including a first mixer configured to up-convert a transmission signal into a radio frequency band; at least one frequency generator configured to generate at least one signal; and at least one switch configured to receive the generated at least one signal from the frequency generator, and to selectively deliver the at least one signal to the first mixer.

According to various example embodiments of the present disclosure, a test apparatus may include: an antenna element including a first feed point; an antenna module including at least one antenna electrically coupled with the first feed point; a board configured to generate a control signal to control the antenna module, and to supply the control signal and a reference clock to the antenna module; a process personal computer (PC) configured to communicate with the board; and a power supply configured to supply power to the antenna module, wherein the antenna module may include at least one transmission chain including: a first mixer configured to up-convert a transmission signal into a radio frequency band; at least one frequency generator configured to generate at least one signal; and at least one switch configured to receive the generated at least one signal from the frequency generator, and to selectively deliver the at least one signal to the first mixer.

According to various example embodiments of the present disclosure, using a front end module to compensate radio frequency (RF) characteristics of a high frequency module and to test non-defective goods and defective goods in a 5G communication system, it is possible to save an investment cost of a signal analyzing equipment and to effectively reduce an equipment space in a module manufacturing line by decreasing a chamber size and generating and testing a signal by itself.

Effects obtainable from the present disclosure are not limited to the above-mentioned effects, and other effects may be included in the scope of the disclosure as will be clearly understood by those skilled in the technical field of various example embodiments through the following disclosure.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Terms used in the present disclosure are used for describing various example embodiments, and may not intend to limit the scope of other embodiments. A singular expression may include a plural expression, unless they are definitely different in a context. The terms used herein, including technical and scientific terms, may have the same meaning as those commonly understood by a person skilled in the art of the present disclosure. Terms defined in a generally used dictionary among the terms used in the present disclosure may be interpreted to have the meanings equal or similar to the contextual meanings in the relevant field of art, and are not to be interpreted to have ideal or excessively formal meanings unless clearly defined in the present disclosure. In some cases, even the term defined in the present disclosure should not be interpreted to exclude embodiments of the present disclosure.

Embodiments of the present disclosure to be described below describe a hardware approach by way of example. However, since the various of the present disclosure include a technology using both hardware and software, various embodiments of the present disclosure do not exclude a software-based approach.

Figure 1:
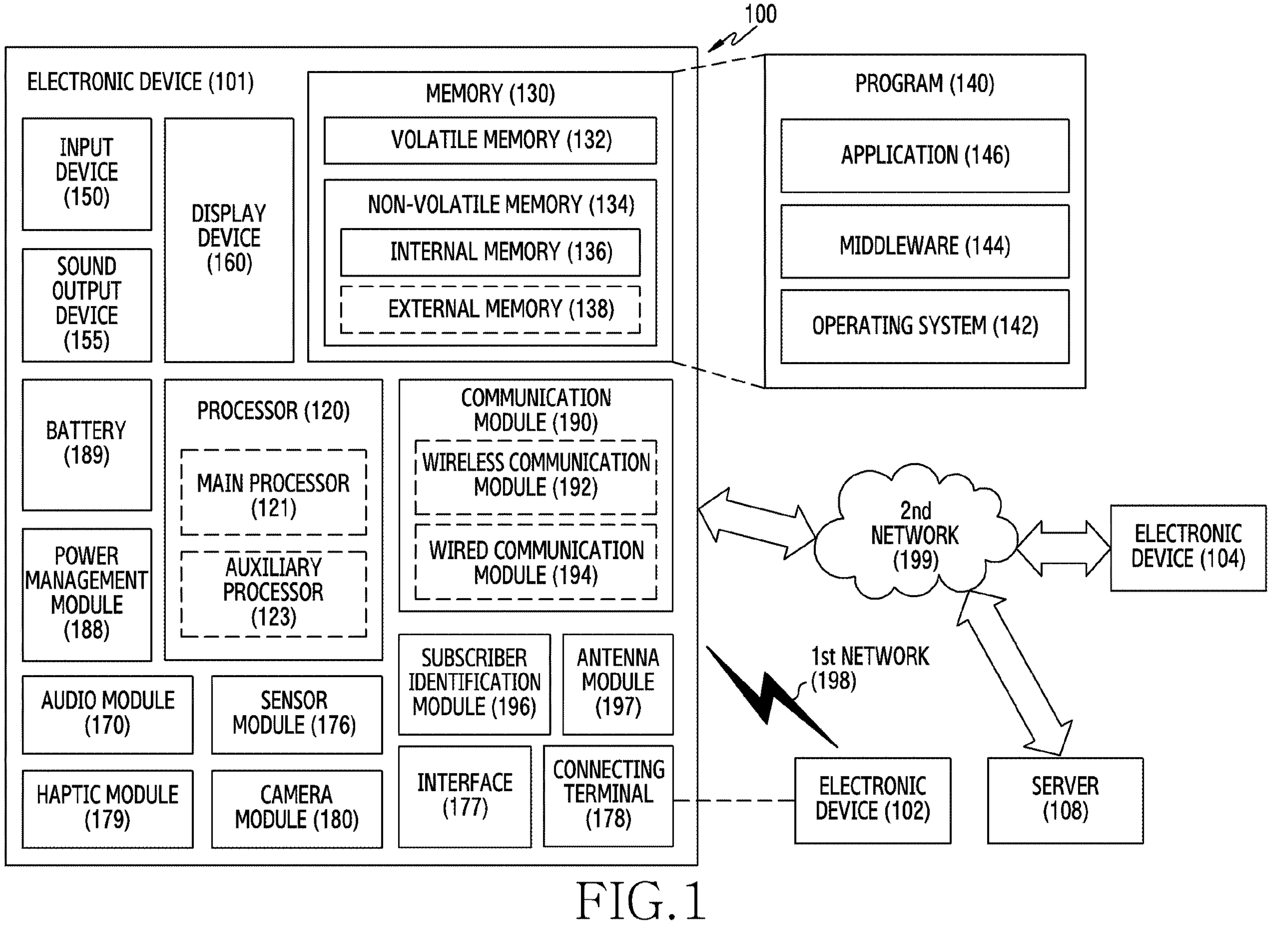
FIG. 1 is a diagram illustrating an example electronic device in a network environment, according to various embodiments.

FIG. 1 is a block diagram illustrating an example electronic device 101 in a network environment 100 according to various embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
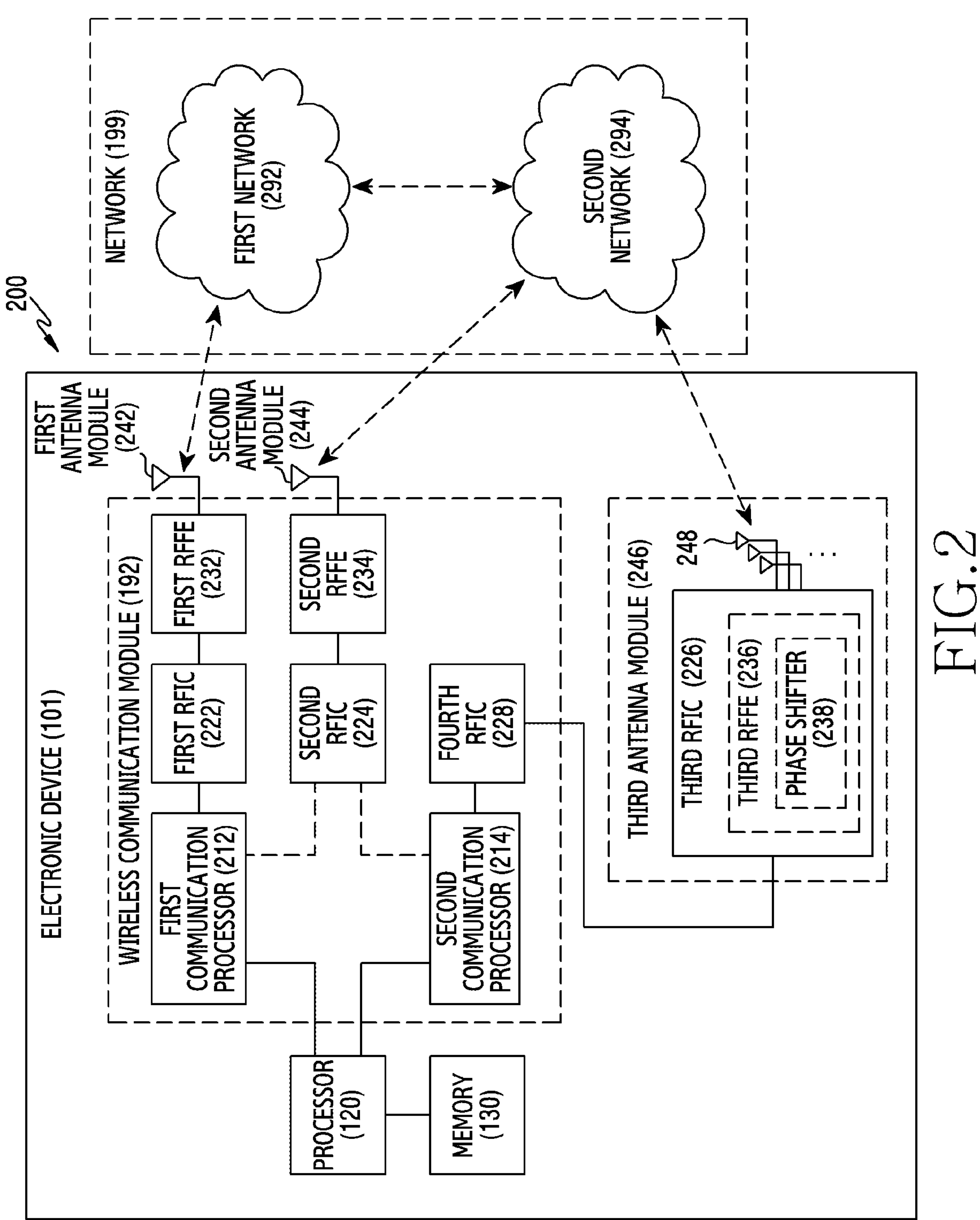
FIG. 2 is a is a block diagram illustrating an example electronic device in a network environment including a plurality of cellular networks according to various embodiments.

FIG. 2 is a block diagram 200 illustrating an example electronic device 101 in a network environment including a plurality of cellular networks according to various embodiments.

Referring to FIG. 2, an electronic device 101 may include a first communication processor (e.g., including processing circuitry) 212, a second communication processor (e.g., including processing circuitry) 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, and an antenna 248. The electronic device 101 may further include a processor (e.g., including processing circuitry) 120 and a memory 130. The second network 199 may include a first cellular network 292 and a second cellular network 294. According to another embodiment, the electronic device may further include at least one of the parts shown in FIG. 1 and the second network 199 may further include at least one another network. According to an embodiment, the first communication processor 212, the second communication processor 214, the first RFIC 222, the second RFIC 224, the fourth RFIC 228, the first RFFE 232, and the second RFFE 234 may form at least a portion of a wireless communication module 192. According to another embodiment, the fourth RFIC 228 may be omitted or may be included as a portion of the third RFIC 226.

The first communication processor 212 can support establishment of a communication channel with a band to be used for wireless communication with the first cellular network 292 and legacy network communication through the established communication channel. According to various embodiments, the first cellular network may be a legacy network including a 2G, 3G, 4G, or Long-Term Evolution (LTE) network. The second communication processor 214 can support establishment of a communication channel corresponding to a designated band (e.g., about 6 GHz~about 60 GHz) of a band to be used for wireless communication with the second cellular network 294 and 5G network communication through the established communication channel. According to various embodiments, the second cellular network 294 may be a 5G network that is defined in 3GPP. Further, according to an embodiment, the first communication processor 212 or the second communication processor 214 can support establishment of a communication channel corresponding to another designated band (e.g., about 6 GHz or less) of a band to be used for wireless communication with the second cellular network 294 and 5G network communication through the established communication channel. According to an embodiment, the first communication processor 212 and the second communication processor 214 may be implemented in a single chip or a single package. According to various embodiments, the first communication processor 212 or the second communication processor 214 may be disposed in a single chip or a single package together with the processor 120, the auxiliary processor 123, or the communication module 190. According to an embodiment, the first communication processor 212 and the second communication processor 214 is directly or indirectly connected by an interface (not shown), thereby being able to provide or receive data or control signal in one direction or two directions.

The first RFIC 222, in transmission, can converts a baseband signal generated by the first communication processor 212 into a radio frequency (RF) signal of about 700 MHz to about 3 GHz that is used for the first cellular network 292 (e.g., a legacy network). In reception, an RF signal can be obtained from the first cellular network 292 (e.g., a legacy network) through an antenna (e.g., the first antenna module 242) and can be preprocessed through an RFFE (e.g., the first RFFE 232). The first RFIC 222 can covert the preprocessed RF signal into a baseband signal so that the preprocessed RF signal can be processed by the first communication processor 212.

The second RFIC 224 can convert a baseband signal generated by the first communication processor 212 or the second communication processor 214 into an RF signal in a Sub6 band (e.g., about 6 GHz or less) (hereafter, 5G Sub6 RF signal) that is used for the second cellular network 294 (e.g., a 5G network). In reception, a 5G Sub6 RF signal can be obtained from the second cellular network 294 (e.g., a 5G network) through an antenna (e.g., the second antenna module 244) and can be preprocessed through an RFFE (e.g., the second RFFE 234). The second RFIC 224 can convert the processed 5G Sub6 RF signal into a baseband signal so that the processed 5G Sub6 RF signal can be processed by a corresponding communication processor of the first communication processor 212 or the second communication processor 214.

The third RFIC 226 can convert a baseband signal generated by the second communication processor 214 into an RF signal in a 5G Above6 band (e.g., about 6 GHz~about 60 GHz) (hereafter, 5G Above6 RF signal) that is used for the second cellular network 294 (e.g., a 5G network). In reception, a 5G Above6 RF signal can be obtained from the second cellular network 294 (e.g., a 5G network) through an antenna (e.g., the antenna 248) and can be preprocessed through the third RFFE 236. The third RFIC 226 can covert the preprocessed 5G Above6 RF signal into a baseband signal so that the preprocessed 5G Above6 RF signal can be processed by the first communication processor 214. According to an embodiment, the third RFFE 236 may be provided as a portion of the third RFIC 226.

The electronic device 101, according to an embodiment, may include a fourth RFIC 228 separately from or as at least a portion of the third RFIC 226. In this case, the fourth RFIC 228 can convert a baseband signal generated by the second communication processor 214 into an RF signal in an intermediate frequency band (e.g., about 9 GHz~about 11 GHz) (hereafter, IF signal), and then transmit the IF signal to the third RFIC 226. The third RFIC 226 can convert the IF signal into a 5G Above6 RF signal. In reception, a 5G Above6 RF signal can be received from the second cellular network 294 (e.g., a 5G network) through an antenna (e.g., the antenna 248) and can be converted into an IF signal by the third RFIC 226. The fourth RFIC 228 can covert the IF signal into a baseband signal so that IF signal can be processed by the second communication processor 214.

According to an embodiment, the first RFIC 222 and the second RFIC 224 may be implemented as at least a portion of a single chip or a single package. According to an embodiment, the first RFFE 232 and the second RFFE 234 may be implemented as at least a portion of a single chip or a single package. According to an embodiment, at least one of the first antenna module 242 or the second antenna module 244 may be omitted, or may be combined with another antenna module and can process RF signals in a plurality of bands.

According to an embodiment, the third RFIC 226 and the antenna 248 may be disposed on a substrate, thereby being able to form a third antenna module 246. For example, the wireless communication module 192 or the processor 120 may be disposed on a first substrate (e.g., a main PCB). In this case, the third RFIC 226 may be disposed in a partial area (e.g., the bottom) and the antenna 248 may be disposed in another partial area (e.g., the top) of a second substrate (e.g., a sub PCB) that is different from the first substrate, thereby being able to form the third antenna module 246. By disposing the third RFIC 226 and the antenna 248 on the same substrate, it is possible to reduce the length of the transmission line therebetween. Accordingly, it is possible to reduce a loss (e.g., attenuation) of a signal in a high-frequency band (e.g., about 6 GHz~about 60 GHz), for example, which is used for 5G network communication, due to a transmission line. Accordingly, the electronic device 101 can improve the quality and the speed of communication with the second cellular network 294 (e.g., 5G network).

According to an embodiment, the antenna 248 may be an antenna array including a plurality of antenna elements that can be used for beamforming. In this case, the third RFIC 226, for example, as a portion of the third RFFE 236, may include a plurality of phase shifters 238 corresponding to the antenna elements. In transmission, the phase shifters 238 can convert the phase of a 5G Above6 RF signal to be transmitted to the outside of the electronic device 101 (e.g., to a base station of a 5G network) through the respectively corresponding antenna elements. In reception, the phase shifters 238 can convert the phase of a 5G Above6 RF signal received from the outside through the respectively corresponding antenna element into the same or substantially the same phase. This enables transmission or reception through beamforming between the electronic device 101 and the outside.

According to an embodiment, the third antenna module 246 may up-convert the baseband transmission signal provided by the second communication processor 214. The third antenna module 246 may a transmit RF transmission signal generated by the up-conversion through at least two transmit/reception antenna elements of a plurality antenna elements 248. The third antenna module 246 may receive a RF reception signal through at least two transmit/reception antenna elements of a plurality antenna elements 248 and at least two reception antenna elements. The third antenna module 246 may generate baseband reception signal by down-converting the RF reception signal. The third antenna module 246 may output the baseband reception signal generated by down-conversion to the second communication processor 214. The third antenna module 246 may comprise at least two transmit/reception circuits in correspondence with the at least two transmit/reception antenna elements and at least two reception circuits in correspondence with the at least two reception antenna elements.

The second cellular network 294 (e.g., a 5G network) may be operated independently from (e.g., Stand-Along (SA)) or connected and operated with (e.g., Non-Stand Along (NSA)) the first cellular network 292 (e.g., a legacy network). For example, there may be only an access network (e.g., a 5G radio access network (RAN) or a next generation RAN (NG RAN)) and there is no core network (e.g., a next generation core (NGC)) in a 5G network. In this case, the electronic device 101 can access the access network of the 5G network and then can access an external network (e.g., the internet) under control by the core network (e.g., an evolved packed core (EPC)) of the legacy network. Protocol information (e.g., LTE protocol information) for communication with a legacy network or protocol information (e.g., New Radio (NR) protocol information) for communication with a 5G network may be stored in the memory 230 and accessed by another part (e.g., the processor 120, the first communication processor 212, or the second communication processor 214).

The processor 120 of the electronic device 101 may include various processing circuitry and execute one or more instructions stored in the memory 130. The processor 120 may include a circuit for data processing, for example, at least one of an IC, an arithmetic logic unit (ALU), a field programmable gate array (FPGA), and large scale integration (LSI). The memory 130 may store data related to the electronic device 101. The memory 130 may include a volatile memory, such as a random access memory (RAM) including a static random access memory (SRAM), a dynamic RAM (DRAM), etc., or may include a non-volatile memory, such as a flash memory, an embedded multimedia card (eMMC), a solid state drive (SSD), etc., as well as a read only memory (ROM), a magneto-resistive RAM (MRAM), a spin-transfer torque MRAM (STT-MRAM), a phase-change RAM (PRAM), a resistive RAM (RRAM), and a ferroelectric RAM (FeRAM).

The memory 130 may store instructions related to an application and instructions related to an OS. The OS is system software executed by the processor 120. The processor 120 may manage hardware components included in the electronic device 101 by executing the operating system. The operating system may provide an application programming interface (API) to applications that are software other than the system software.

One or more applications, which are a set of multiple instructions, may be installed in the memory 130. Installation of an application in the memory 130 may indicate that the application is stored in a format executable by the processor 120 connected to the memory 130.

Figure 3A:
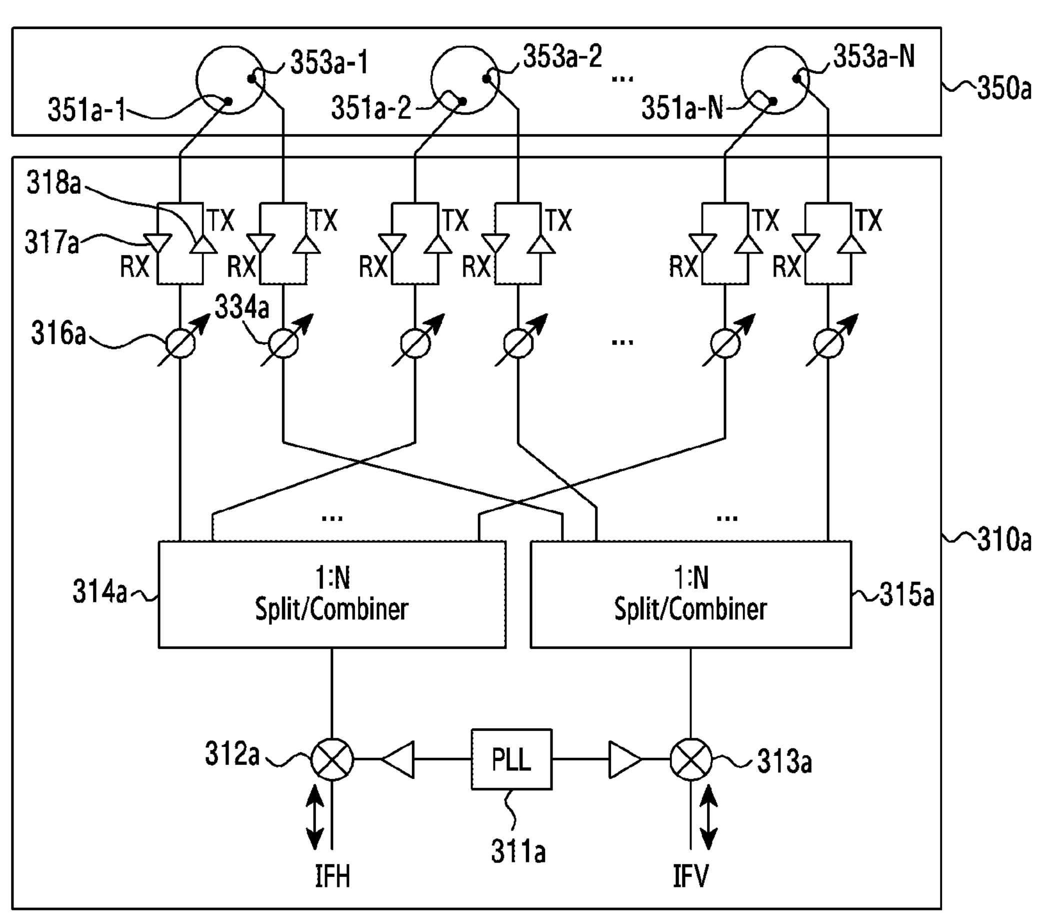
FIG. 3A is a diagram illustrating an example configuration of a first antenna module of a communication module of an electronic device, according to various embodiments.

FIG. 3A is a diagram 300*a* illustrating an example configuration of an antenna module (e.g., the third antenna module 246 of FIG. 2) included in an electronic device (e.g., the electronic device 101 of FIG. 1), according to various embodiments.

If an antenna radiates a signal of a frequency band over about 20 GHz through a free space, it may exhibit attenuation characteristics over 20 through 30 dB compared to a signal not exceeding 60 GHz band. An antenna module structure 300*a* and 300*b* (e.g., FIG. 3B) for transmitting and/or receiving a phase-aligned signal through a plurality of antennas has been suggested to overcome a coverage reduction issue according to the frequency increase. For example, the antenna module may transmit and/or receive the signal of the frequency band over about 20 GHz using an array antenna including a plurality of antennas.

Referring to FIG. 3A, the antenna module 300*a* according to an embodiment may include a transmit/reception chain which is a path for delivering a radio signal. For example, the transmit/reception chain may have a structure including a transmission chain corresponding to a transmission path which transmits the radio signal and a reception chain corresponding to a reception path which receives the radio signal. The transmit/reception chain may include a transmission circuit for processing an RF signal to transmit and a reception circuit for processing a received RF signal. The transmit/reception circuit may be used as a term for indicating the transmission circuit and the reception circuit together.

According to an embodiment, the antenna module 300*a* may include an RFIC 310*a* and/or an antenna structure 350*a*. For example, the RFIC 310*a* may include a first mixer 312*a*, a second mixer 313*a*, a phase locked loop (PLL) 311*a*, a second split/combiner 314*a*, a second split/combiner 315*a*, a phase shifter 316*a*, a power amplifier 318*a*, or a low noise amplifier 317*a*.

Referring to FIG. 3A, the structure having the first mixer 312*s* and/or the second mixer 313*a* is shown so that, for example, the RFIC 310*a* may independently perform up/down frequency conversion on the radio signal having dual polarization characteristics.

According to various embodiments, the PLL 311*a* may generate a reference signal and/or a test signal. The reference signal may be used for the up/down frequency conversion of the radio signal. The reference signal may be used, for example, to up-convert a baseband (BB) signal or an intermediate frequency (IF) signal to an RF signal or to down-convert an RF signal to a BB signal or an IF signal. In an embodiment, the test signal may be used as a self-testing signal for self-testing the antenna module 300*a*. For example, the test signal may be the self-testing signal for the self-testing of the antenna module 300*a*. For example, the test signal may be the self-testing signal for the self-testing. The test signal may be, for example, at least one of a BB signal for the self-testing (hereafter, referred to as a 'BB test signal'), an IF signal for the self-testing (hereafter, referred to as an 'IF test signal') and/or an RF signal for the self-testing (hereafter, referred to as an 'RF test signal').

According to various embodiments, at least one mixer 312*a* and/or 313*a* may include the first mixer 312*a* which performs the up/down frequency conversion on the radio signal (e.g., IFH) having horizontal polarization characteristic of the dual polarization characteristic and the second mixer 313*a* which performs the up/down frequency conversion on the radio signal (e.g., IFV) having vertical polarization characteristic of the dual polarization characteristics. The first and/or second mixers 312*a* and/or 313*a* may, for example, generate an RF transmission signal (e.g., an RF test transmission signal) by mixing the BB transmission signal (e.g., a BB test transmission signal) or the IF transmission signal (e.g., an IF test transmission signal) with the reference signal or generate an IF reception signal (e.g., an IF test reception signal) or a BB reception signal (e.g., a BB test reception signal) by mixing an RF reception signal (e.g., an RF test reception signal) with the reference signal. At least one test transmission signal of the BB test transmission signal or the IF test transmission signal may be generated by the PLL 311*a*. If the RF test transmission signal is generated by the PLL 311*a*, the first and/or second mixers 312*a* and/or 313*a* may not be used for self-testing the antenna module 300*a*.

According to an embodiment, the RFIC 310*a* may include the first and second split/combiners 314*a* and 315*a*, to achieve split/combining per radio signal having the same polarization characteristic of the dual polarization characteristics. The first and second split/combiners 314*a* and 315*a* may, for example, divide the RF transmission signal (e.g., the RF test transmission signal) having the horizontal polarization characteristic of the dual polarization characteristics to some or all of a plurality of (e.g., a number of N) transmission/reception chains, or combine RF reception signals (e.g., RF test reception signals) provided from some or all of the plurality of (e.g., a number of N) transmission/ reception chains to output as one RF signal. In an embodiment, the number of the transmission/reception chains coupled with the first split/combiner 314*a* may be equal to or different from the number of the transmission/reception chains coupled with the second split/combiner 315*a*.

According to an embodiment, the RFIC 310*a* may include a transmission/reception chain. A transmission path of one transmission/reception chain may include the phase shifter 316*a* and the power amplifier 318*a*, and a reception path of the one transmission/reception chain may include the low noise amplifier 317*a* and the phase shifter 316*a*. As another example, while FIG. 3A shows that the phase shifter 316*a* is commonly used in the transmission path and the reception path, the phase shifter may be included in the transmission path and the reception path each. The RFIC 310*a* may deliver the RF transmission signal (e.g., the RF test transmission signal) provided from the first split/combiner 314*a* to the antenna structure 350*a* through at least one transmission path or deliver the RF reception signal (e.g., the RF test reception signal) provided from the antenna structure 350*a* to the second split/combiner 315*a* through at least one reception path.

According to an embodiment, the plurality of (e.g., a number of N) transmission/reception chains included in the RFIC 310*a* may electrically connect the first split/combiner 314*a* and the second split/combiner 315*a* with a plurality of (e.g., a number of N) antenna elements included in the antenna structure 350*a*. The RFIC 310*a* may include, for example, first transmission/reception chains for electrically connecting the first split/combiner 314*a* with the plurality of (e.g., a number of N) antenna elements included in the antenna structure 350*a* and second transmission/reception chains for electrically connecting the second split/combiner 315*a* with the antenna elements included in the antenna structure 350*a*.

According to an embodiment, the first transmission/reception chains may electrically couple the first split/combiner 314*a* and first feed points 351*a*-1, 351*a*-2 through 351*a*-N (which may be referred to hereinafter as first feed points 351*a*-1 through 351*a*-N) positioned in the plurality of (e.g., a number of N) antenna elements, and the second transmit/reception chains may electrically couple the second split/combiner 315*a* and second feed points 353*a*-1 through 353*a*-N positioned in the plurality of (e.g., a number of N) antenna elements. For example, one transmission/reception chain of the first transmission/reception chains (e.g., a number of N) may include the first power amplifier 318*a*, the first low noise amplifier 317*a* and/or the first phase shifter 316*a*. The power amplifier 318*a* and the first phase shifter 316*a* may build one transmission path which electrically connects the first split/combiner 314*a* and the first feed point 351*a*-1 included in one antenna element of the antenna elements included in the antenna structure 350*a*. The first low noise amplifier 317*a* and/or the first phase shifter 316*a* may build one reception path which electrically connects the second feed point 353*a*-1 included in one antenna element of the antenna elements included in the antenna structure 350*a* and the first split/combiner 314*a*.

According to an embodiment, if transmitting an RF signal, the first phase shifter 316*a* may shift a phase of the RF transmission signal output from the first split/combiner 314*a* and apply it to the first power amplifier 318*a*. The first power amplifier 318*a* may amplify power of the RF transmission signal provided from the first phase shifter 316*a* and apply it to the first feed point 351*a*-1 included in one antenna element of the antenna structure 350*a*.

According to an embodiment, if receiving an RF signal, the first low noise amplifier 317*a* may forward the RF reception signal applied from the first feed point 351*a*-1 included in one antenna element of the antenna structure 350*a* to the first low noise amplifier 317*a*. The first low noise amplifier 317*a* may low noise amplify the RF reception signal applied from the first feed point 351*a*-1 and forward it to the first phase shifter 316*a*. The first phase shifter 316*a* may shift the phase of the RF reception signal received from the first low noise amplifier 317*a* and provide it to the first split/combiner 314*a*.

According to various embodiments, the antenna structure 350*a* may include the plurality of (e.g., a number of N) antenna elements. The plurality of (e.g., a number of N) antenna elements may include the first feed points 351*a*-1 through 351*a*-N, or the second feed points 353*a*-1 through 353*a*-N. The first feed points 351*a*-1 through 351*a*-N and the second feed points 353*a*-1 through 353*a*-N may be, for example, orthogonal to each other. Herein, orthogonality may have a technical meaning that extensions drawn to pass through the feed points and the center of the antenna element are substantially perpendicular to each other.

According to an embodiment, the plurality of (e.g., a number of N) antenna elements may have a structure for transmitting/receiving the RF signal having the vertical polarization characteristic and the RF signal having the polarization characteristic. The plurality of (e.g., a number of N) antenna elements included in the antenna structure 350*a* may include the first feed points 351*a*-1 through 351*a*-N for inputting/outputting the RF signal having the vertical polarization characteristic, and the second feed points 353*a*-1 through 353*a*-N for inputting/outputting the RF signal having the horizontal polarization characteristic.

According to an embodiment, one or more (e.g., a number of N) antenna elements included in the antenna structure 350*a* may radiate the RF test transmission signal. The radiated RF test transmission signal may be received by one or more (e.g., a number of N) antenna elements included in the antenna structure 350*a* and output as the RF test reception signal or may be received by a test device separately included and used as the RF test reception signal. The radiated RF test transmission signal may be received by one or more (e.g., a number of N) antenna elements which are the same as or different from some or all of the one or more (e.g., a number of N) antenna elements which radiate the RF test transmission signal. For example, the RF test transmission signal applied to the first feed point 351*a*-1 may be received at the second feed point 353*a*-1 positioned in the same antenna element as the first feed point 351*a*-1 and used as the RF test reception signal.

Figure 3B:
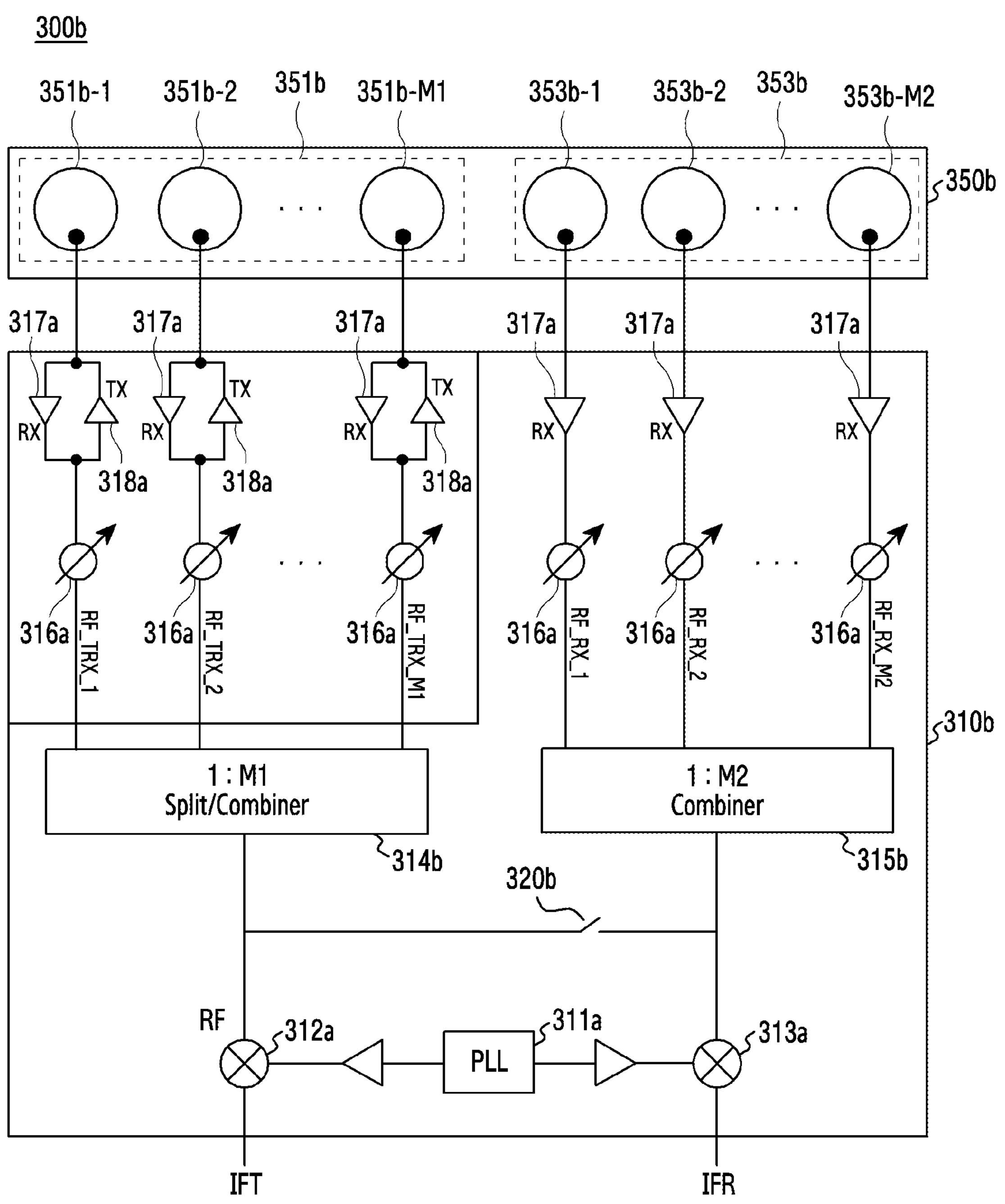
FIG. 3B is a diagram illustrating an example configuration of a second antenna module of the electronic device, according to various embodiments.

FIG. 3B is a diagram illustrating an example configuration of the antenna module 300*b* (e.g., the third antenna module 246 of FIG. 2) included in a communication module (e.g., the communication module 200 of FIG. 2) of the electronic device (e.g., the electronic device 101 of FIG. 1), according to various embodiments.

Referring to FIG. 3B, the antenna module 300*b* according to an embodiment may include a plurality of paths for delivering radio signals including a transmit/receive by one or more transmit/reception chains, or a reception path by one or more reception chains. The transmission/reception chain may have substantially the same configuration as, for example, the transmission/reception chain shown in FIG. 3A. The reception chain may have, for example, a structure corresponding to the reception path for receiving the radio signal. The reception path may include a reception chain included an RFIC 310*b*, some reception path for connecting a split/combiner 314*b* and a combiner 315*b*, and/or some path including a first mixer 312*a* and a second mixer 313*a* included in the RFIC 310*b*. The reception chain may be formed as a reception circuit for processing the received RF signal. The reception circuit may include a low noise amplifier 317*b*, and/or a phase shifter 316*b*.

According to an embodiment, the RFIC 310*b* may include the split/combiner 314*b*, the combiner 315*b*, the phase shifter 316*a*, the low noise amplifier 317*a*, the power amplifier 318*a*, and/or the antenna structure 350*b*. For example, the first split/combiner 314*b* and the second split/combiner 315*b* may be included in the RFIC 310*b* to build one integrated circuit.

According to an embodiment, the RFIC 310*b* may include a PLL 311*a*, and at least one mixer 312*a* and/or 313*a*. For example, the at least one mixer 312*a* and/or 313*a* may include the first mixer 312*a* or the second mixer 313*a*.

According to an embodiment, the antenna structure 350*b* may include first antenna elements 351*b*-1 through 351*b*-M1, or second antenna elements 353*b*-1 through 353*b*-M2. For example, the first antenna elements 351*b*-1, 351*b*-2 through 351*b*-M1 may transmit and/or receive an RF signal. As another example, the second antenna elements 353*b*-1, 353*b*-2 through 353*b*-M2 may receive an RF signal. The first antenna elements 351*b*-1 through 351*b*-M1 may be included in the first antenna array 351*b*. The second antenna elements 353*b*-1 through 353*b*-M2 may be included in the second antenna array 353*b*.

According to various embodiments, the PLL 311*a* may generate a reference signal and/or a test signal. The reference signal may be used for the up/down conversion of the radio signal, and the test signal may be used for self-testing the antenna module 300*b*. The test signal may be used to, for example, up-convert a BB signal or an IF signal to an RF signal or down-convert an RF signal to a BB signal or an IF signal. The test signal may be, for example, at least one of a BB test signal, an IF test signal and/or an RF test signal.

According to various embodiments, the first mixer 312*a* may perform the up-conversion to generate a radio signal to be transmitted by the first antenna elements 351*b*-1 through 351*b*-M1. The first mixer 312*a* may, for example, generate an RF transmission signal (e.g., an RF test transmission signal) by mixing the BB transmission signal (e.g., a BB test transmission signal) or the IF transmission signal (e.g., an IF test transmission signal) with the reference signal or may generate an IF reception signal (e.g., an IF test reception signal) or a BB reception signal (e.g., a BB test reception signal) by mixing an RF reception signal (e.g., an RF test reception signal) with the reference signal. At least one test transmission signal of the BB test transmission signal or the IF test transmission signal may be generated by the PLL 311*a*. If the RF test transmission signal is generated by the PLL 311*a*, the first mixer 312*a* may not be used for self-testing the antenna module 300*b*.

According to various embodiments, the second mixer 313*a* may perform the down-conversion to generate a radio signal received by the second antenna elements 353*b*-1 through 353*b*-M2. The second mixer 313*a* may generate, for example, an IF reception signal (e.g., an IF test reception signal) or a BB reception signal (e.g., a BB test reception signal) by mixing an RF reception signal (e.g., an RF test reception signal) with the reference signal.

According to various embodiments, the split/combiner 314*b* may divide the RF transmission signal (e.g., the RF test transmission signal) provided from the RFIC 310*b* to some or all of a plurality of (e.g., M1-ary) transmission/reception chains, or provide one RF signal to the RFIC 310*b* by combining RF reception signals (e.g., RF test reception signals) provided from some or all of the plurality of (e.g., M1-ary) transmission/reception chains. The combiner 315*b* may provide one RF signal to the RFIC 310*b* by combining the RF reception signals (e.g., RF test reception signals) provided from some or all of a plurality of (e.g., M2-ary) reception chains. A switch 320*b* may selectively deliver the RF reception signal output from the combiner 315*b* to the RFIC 310*b*. For example, the RF test transmission signal radiated through the first antenna elements 351*b*-1 through 351*b*-M1 may be received through the second antenna elements 353*b*-1 through 353*b*-M2 and used as the RF test reception signals.

According to an embodiment, the RFIC 310*b* may include the plurality of (e.g., M1) transmission/reception chains by transmission/reception circuits. The RFIC 310*b* may include the plurality of (e.g., M2) reception chains by reception circuits. A transmission path of one transmission/reception chain may include a phase shifter and a power amplifier, and a reception path of the one transmission/reception chain and/or a reception path of one reception chain may include a phase shifter and a low noise amplifier. The RFIC 310*b* may, for example, deliver the RF transmission signal (e.g., the RF test transmission signal) provided from the split/combiner 314*b* to the antenna structure 350*b* through at least one transmission path or deliver the RF reception signal (e.g., the RF test reception signal) from the antenna structure 350*b* to the first split/combiner 314*b* through at least one reception path. The RFIC 310*b* may deliver the RF reception signal (e.g., the RF test reception signal) from the antenna structure 350*b* to the combiner 315*b* through at least one reception path.

According to an embodiment, the plurality of (e.g., M1-ary) transmission/reception chains included in the RFIC 310*b* may electrically connect the split/combiner 314*b* and the plurality of (e.g., M1-ary) first antenna elements 351*b*-1 through 351*b*-M1 included in the antenna structure 350*b*. The plurality of (e.g., M2-ary) reception chains included in the RFIC 310*b* may electrically connect the combiner 315*b* and the plurality of (e.g., M2-ary) second antenna elements 353*b*-1 through 353*b*-M2 included in the antenna structure 350*b*.

Figure 3C:
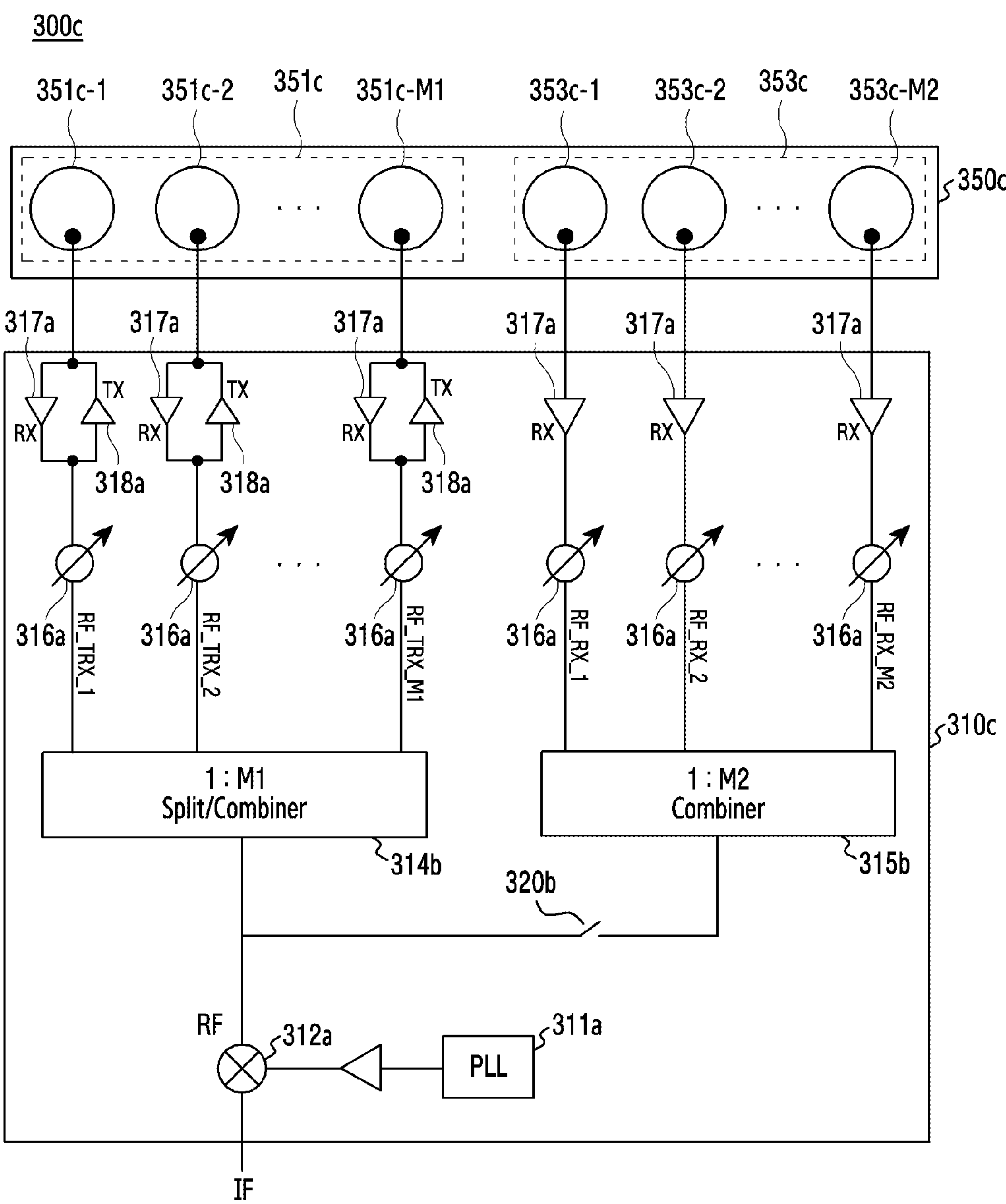
FIG. 3C is a diagram illustrating an example configuration of a third antenna module of the electronic device, according to various embodiments.

FIG. 3C is a diagram illustrating an example configuration of an antenna module 300*c* (e.g., the third antenna module 246 of FIG. 2) included in the communication module (e.g., the communication module 200 of FIG. 2) of the electronic device (e.g., the electronic device 101 of FIG. 1), according to various embodiments.

According to an embodiment, the antenna module 300*c* may include an RFIC 310*c*, and/or an antenna structure 350*c*. According to an embodiment, the antenna structure 350*c* may include first antenna elements 351*c*-1, 351*c*-2 through 351*c*-M1, or second antenna elements 353*c*-1, 353*c*-2 through 353*c*-M2. The first antenna elements 351*c*-1 through 351*c*-M1 may be included in a first antenna array 351*c*. The second antenna elements 353*c*-1 through 353*c*-M2 may be included in a second antenna array 353*c*.

Referring to FIG. 3C, a split/combiner 314*b*, a combiner 315*b*, and/or the antenna structure 350*c* may be substantially the same configuration as the split/combiner 314*b*, the combiner 315*b*, and/or the antenna structure 350*b* of FIG. 3B.

According to an embodiment, the RFIC 310*c* may include one mixer 312*a* unlike FIG. 3B. According to various embodiments, the one mixer 312*a* may perform the up frequency conversion to generate a radio signal to be transmitted by the first antenna elements 351*c*-1 through 351*c*-

M1. According to various embodiments, the one mixer 312*a* may perform the down frequency conversion on a radio signal received by the first antenna elements 351*c*-1 through 351*c*-M1, or the second antenna elements 353*c*-1 through 353*c*-M2. The mixer 312*a* may generate an RF transmission signal (e.g., an RF test transmission signal) by mixing a BB transmission signal (e.g., a BB test transmission signal) or an IF transmission signal (e.g., an IF test transmission signal) with the reference signal or may generate an IF reception signal (e.g., an IF test reception signal) or a BB reception signal (e.g., a BB test reception signal) by mixing an RF reception signal (e.g., an RF test reception signal) with the reference signal. At least one test transmission signal of the BB test transmission signal or the IF test transmission signal may be generated by the PLL 311*a*. If the RF test transmission signal is generated by the PLL 311*a*, the mixer 312*a* may not be used for self-testing the antenna module 300*c*.

Figure 4:
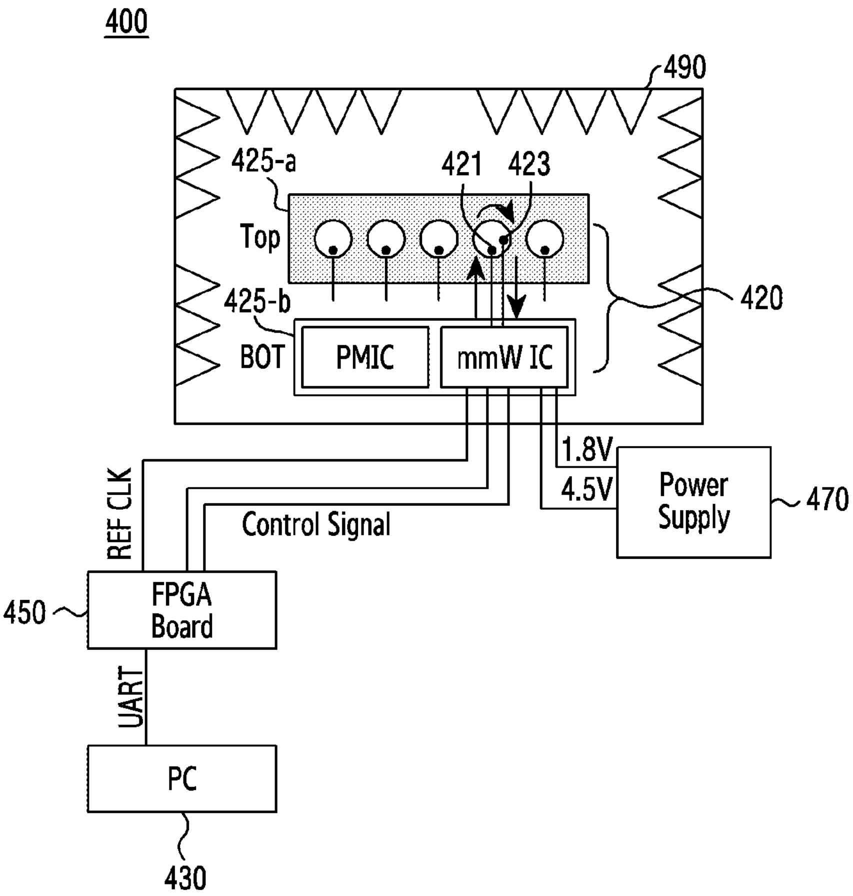
FIG. 4 is a diagram illustrating an example of an antenna module test system, according to various embodiments.

FIG. 4 is a diagram illustrating an example of an antenna module test system 400 having a radiation structure, according to various embodiments. The antenna module test system 400 may have a structure for building receive and transmission paths, for example, a loopback path of a test signal corresponding to a self-testing signal by an antenna module. The antenna module test system 400 shown in FIG. 4 may not include a separate loopback path and may utilize a reception path of the antenna module instead of the loopback path.

Referring to FIG. 4, the antenna module test system 400 according to an embodiment may be an equipment-less module inspection system. The antenna module test system 400 may include an antenna module 420 (e.g., the antenna module 300*a* of FIG. 3A or the antenna module 300*b* of FIG. 3B), a PC 430 (e.g., a processing PC), a board 450 (e.g., a FPGA board), a chamber 490, and/or a power supply 470.

According to an embodiment, the PC 430 may be connected to the separate board 450 through a specific interface. The PC 430 may communicate with the board 450 using, for example, a universal asynchronous receiver/transmitter (UART) interface.

Figure 12:
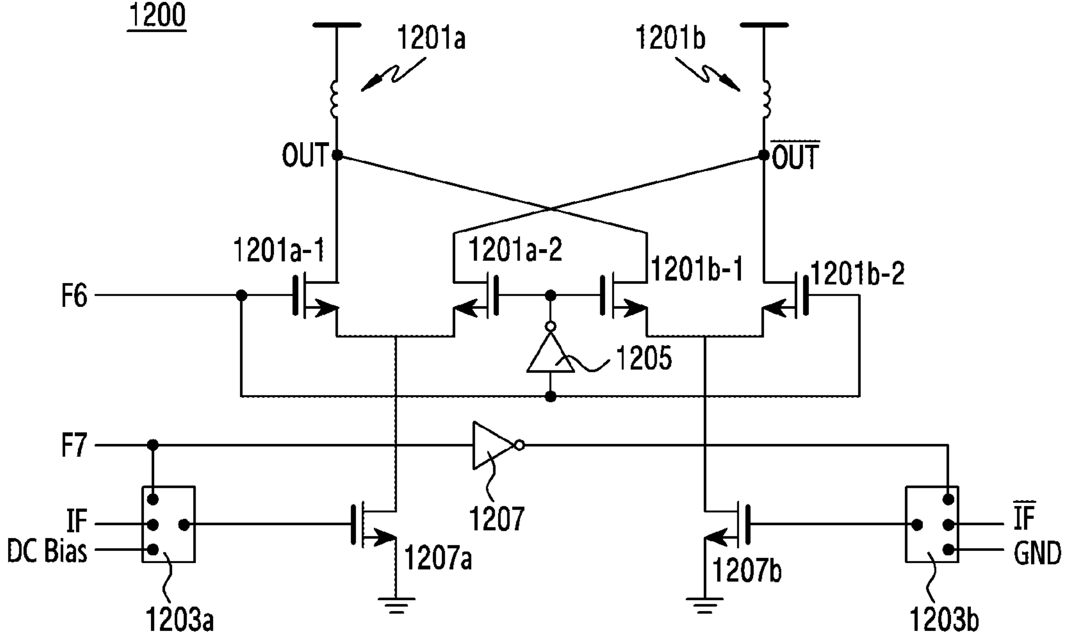
FIG. 12 is a diagram illustrating an example internal circuit of a reconfigure mixer, according to various embodiments.

According to an embodiment, the board 450 may generate a control signal to control the antenna module 420. The board 450 may provide the generated control signal to the antenna module 420. The control signal may be used to select and/or determine an output frequency of a frequency generator included in the antenna module 420. The control signal may be used to, for example, select two arbitrary frequencies from F4_1, F5_1, F4_1, and F4_2, as shown in FIG. 12.

According to an embodiment, the board 450 may supply a reference clock (REF CLK) to the antenna module 420. The REF CLK may be used, for example, for the antenna module 420 to generate a local oscillator (LO) frequency signal. The LO frequency may be used to up-convert a test transmission signal, or to down-convert a test reception signal by one or more mixers included in the antenna module 420.

According to an embodiment, the antenna module 420 may include an antenna structure (e.g., the antenna structure 350*a* of FIG. 3A or the antenna structure 350*b* of FIG. 3B) on one surface (e.g., a front surface) 425-*a*, and one PCB including a transmission/reception circuit on the other surface (e.g., a rear surface) 425-*b*. The transmission/reception circuit may include, for example, an RFIC (e.g., the RFIC 310*a* of FIG. 3A or the RFIC 310*b* of FIG. 3B, the first split/combiner 314*a* of FIG. 3A or the first split/combiner 314*b* of FIG. 3B, the low noise amplifier 317*a*, the power amplifier 318*a*, and/or the phase shifter 316*a*). The antenna structure may include, for example, a plurality of antenna elements.

According to an embodiment, the antenna element 425-*a* may include a first feed point 421 and/or a second feed point 423. The first feed point 421 and/or the second feed point 423 may be electrically connected to the transmit/reception circuit (e.g., an mmW IC). The first feed point 421 may, for example, receive and radiate a test transmission signal through a transmission chain of the transmission/reception circuit, and the second feed point 423 may, for example, receive and forward a test transmission signal in the chamber 490 to a reception chain included in the transmission/reception circuit. The test reception signal may be used to detect performance and failure of the antenna module 420. The drawing shows that the one antenna element 425-*a* radiates an RF test signal in the chamber 490, and receives the radiated RF test signal. For example, the test transmission signal radiated from the first feed point 421 may be received at the second feed point 423, and used as the test reception signal. However, this is only one example, and the antenna element radiating the RF test signal in the chamber 490 may be different from the antenna element which receives the radiated RF test signal.

If the antenna module test system 400 is formed as shown in FIG. 4, the size of the chamber 490 may be relatively reduced. This is because a compact design is possible because the chamber 490 serves merely as the shielding. Also, if the antenna module test system 400 is formed as shown in FIG. 4, the loopback may be formed by itself to process the signal analysis of the antenna module 420 by itself, thus saving cost by omitting the loopback test equipment.

Figure 5A:
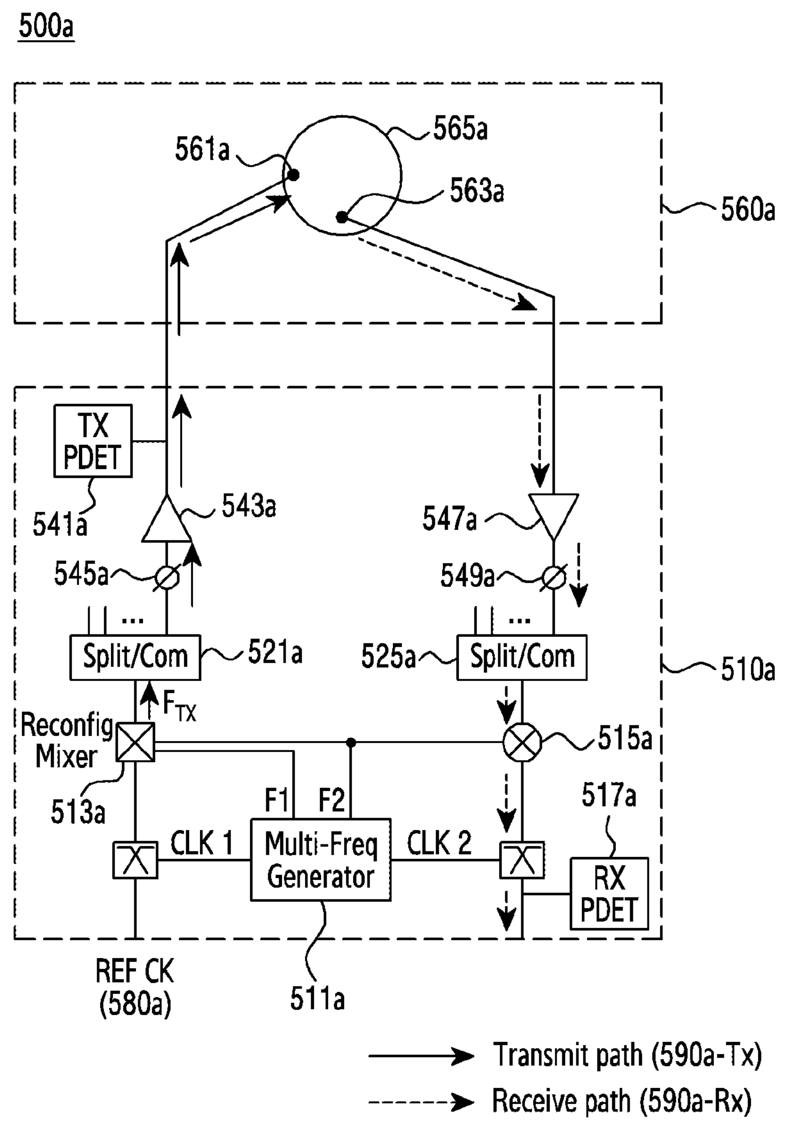
FIG. 5A is a diagram illustrating an example of an antenna module structure for generating a self-testing signal for self-testing by itself, according to various embodiments.

FIG. 5A is a diagram illustrating an example configuration of an antenna module (e.g., the antenna module 420 of FIG. 4) for generating a self-testing signal for self-testing by itself, according to various embodiments.

According to an embodiment, for convenience of explanations, FIG. 5A shows that an antenna module 500*a* includes one antenna element 565*a* (e.g., one antenna element of the antenna elements of FIG. 3A) included in an antenna structure 560*a* (e.g., the antenna structure 350*a* of FIG. 3A), one transmission path (or a transmission chain), and one reception path (or a reception chain). In this case, it is assumed that, for example, the one antenna element 565*a* is used as a radiator of two antennas supporting the dual polarization characteristics, uses one of the two antennas as a transmission antenna, and uses the other as a reception antenna. As another example, the one antenna element 565*a* supporting the dual polarization characteristics may be replaced by a first antenna element operating as the transmission antenna by electrically coupling to one transmission path (or transmission chain), and a second antenna element operating as the reception antenna by electrically coupling to one reception path (or reception chain). The first antenna element may be, for example, one antenna element of the antenna elements of FIG. 3A, one antenna element of the antenna elements 351*b*-1 through 351*b*-M1 supporting the transmission/reception in FIG. 3B or one antenna element of the antenna elements 351*c*-1 through 351*c*-M1 supporting the transmission/reception in FIG. 3C. The second antenna element may be, for example, one antenna element of the antenna elements of FIG. 3A, one antenna element of the antenna elements 351*b*-1 through 351*b*-M1 supporting the transmission/reception or one antenna element of the antenna elements 353*b*-1 through 353*b*-M2 supporting the reception in FIG. 3B or one antenna element of the antenna elements 351c-1 through 351c-M1 supporting the transmission/reception or one antenna element of the antenna elements 353c-1 through 353c-M2 supporting the reception in FIG. 3C.

Referring to FIG. 5A, the antenna module 500a according to an embodiment may have a structure including therein a loopback path which delivers the RF test reception signal. The antenna module 500a may enable the self-testing by, for example, the antenna module test system 400 shown in FIG. 4.

According to an embodiment, the antenna module 500a may include an RFIC 510a and/or an antenna structure 560a. The antenna structure 560a may include at least one antenna element 565a.

According to an embodiment, the RFIC 510a may include a first split/combiner 521a, and a second split/combiner 525a included in the RFIC 510a. It is assumed that the split/combiner 521a and/or 525a is independently included for each of the transmission path and the reception path in the drawing, but a single split/combiner may be disposed for the transmission path and the reception path. The first split/combiner 521a may divide an RF test transmission signal supplied from a first mixer 513a to one or more transmission chains. The second split/combiner 525a may combine RF test reception signals supplied from one or more transmission chains, and deliver the one combined RF test reception signal to a second mixer 515a.

According to an embodiment, the RFIC 510a may include a transmission circuit corresponding to one transmission chain which includes a TX power detector 541a, a first phase shifter 545a, or a power amplifier 543a, and a reception circuit corresponding to one reception chain which includes a low noise amplifier 547a or a second phase shifter 549a. The transmission chain may, for example, deliver the RF test transmission signal output from the first mixer 513a to a first feed point 561a included in the antenna element 565a. The reception chain may, for example, deliver the RF test reception signal output from a second feed point 563a included in the antenna element 565a to the second mixer 515a. The TX power detector 541a may detect power of the RF test transmission signal output through the power amplifier 543a, and obtain performance and/or characteristics of the antenna module 500a by considering the detected RF test transmission signal power.

According to an embodiment, the antenna structure 560a may include the antenna element 565a having the first feed point 561a, or the second feed point 563a. The antenna element 565a may radiate the RF test transmission signal delivered to the first feed point 561a to outside through the transmission chain. The antenna element 565a may receive part of the radiated RF test transmission signal and forward it to the reception chain via the second feed point 563a. As another example, the antenna element 565a may forward at least part of the RF test transmission signal delivered from the first feed point 561a to the second feed point 563a. For example, at least part of the RF test transmission signal delivered to the second feed point 563a may be the RF test reception signal.

According to an embodiment, a transmission path 590a-Tx indicated by the solid line may be a series of paths for dividing the RF test transmission signal generated by the first mixer 513a to the first phase shifter 545a through the first split/combiner 521a, shifting the phase by the first phase shifter 545a and then amplifying the power at the power amplifier 543a, and delivering the power-amplified RF test transmission signal to the first feed point 561a.

According to an embodiment, a reception path 590a-Rx indicated by the dotted line may be a series of paths for delivering the received RF test reception signal from the second feed point 563a to the low noise amplifier 547a, low noise amplifying at the low noise amplifier 547a and then shifting the phase by the second phase shifter 549a, combining at the second split/combiner 525a after shifting the phase by the second phase shifter 549a and delivering it to the second mixer 515a.

According to an embodiment, a multi-frequency generator 511a may generate and output a plurality of signals having different frequencies using a reference clock CLK1 and/or CLK2. The plurality of the signals having the different frequencies may include, for example, a first output signal F1, or a second output signal F2. The first output signal F1 may be a test transmission signal (e.g., a BB, IF, or RF test transmission signal), and the second output signal F2 may be the reference signal having the LO frequency to be used to up-convert the test transmission signal or to down-convert the test reception signal.

According to an embodiment, the first mixer 513a may be a reconfigure mixer. The reconfigure mixer may perform an operation of outputting one signal by receiving two signals having different frequencies. The first mixer 513a may, for example, receive the first output signal F1 and the second output signal F2 from the multi-frequency generator 511a, and generate an RF signal (e.g., an RF test transmission signal) by up-converting the first output signal F1 (e.g., the BB or IF test transmission signal) using the second output signal F2 (e.g., the reference signal) (corresponding to FIGS. 6 and 8). The first mixer 315 may, as another example, output the first output signal F1 (e.g., the RF test transmission signal) input from the multi-frequency generator 511a (corresponding to FIGS. 7 and 9).

According to an embodiment, the second mixer 515a may receive the second output signal F2 from the multi-frequency generator 511a, and generate a test signal (e.g., a BB or IF test transmission signal) by down-converting the RF test reception signal delivered through the reception path using the second output signal F2 (e.g., the reference signal).

Figure 5B:
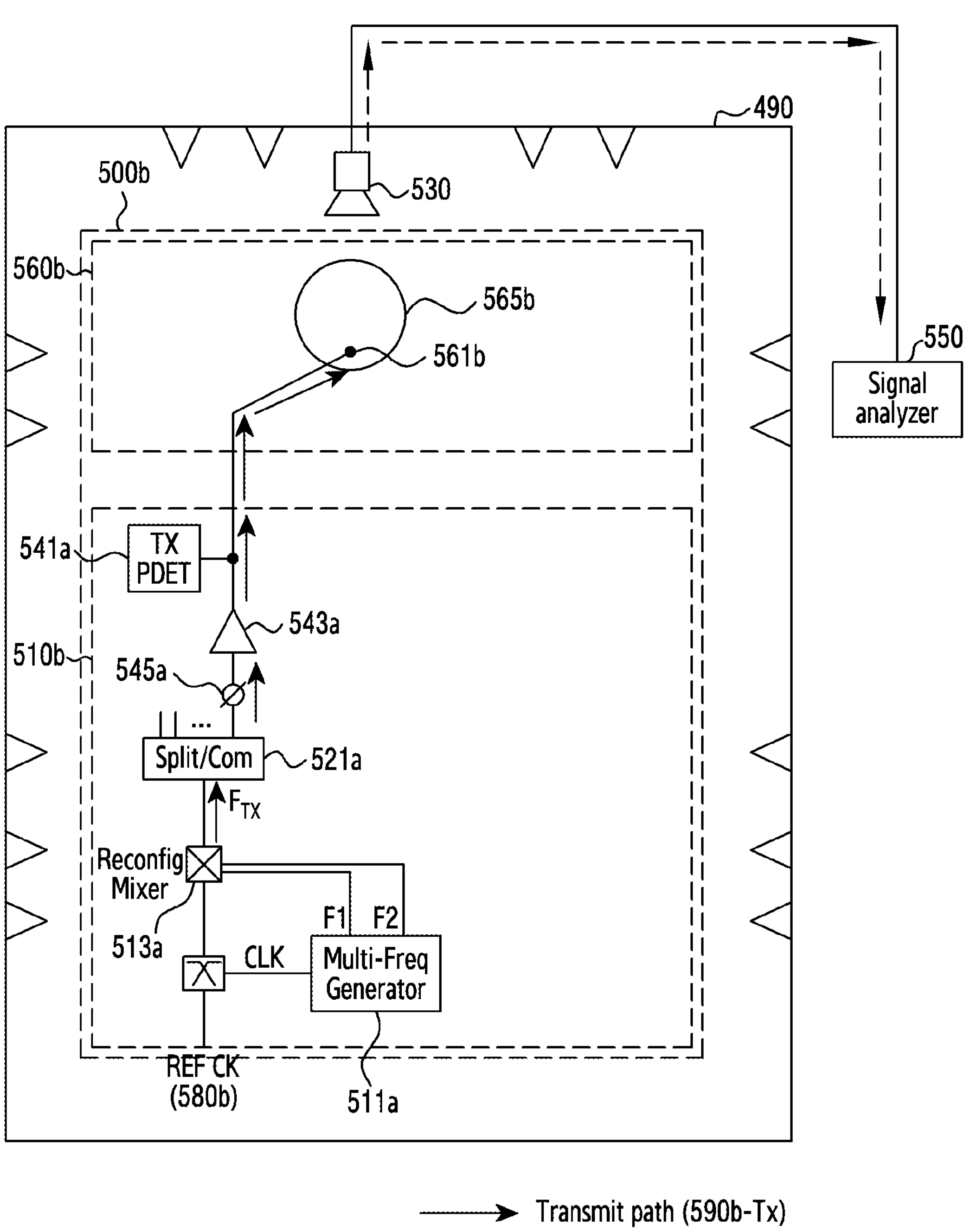
FIG. 5B is a diagram illustrating an example of the antenna module structure for generating the self-testing signal for the self-testing by itself, according to various embodiments.

FIG. 5B is a diagram showing an example of the antenna module structure for generating the self-testing signal for the self-testing by itself, according to an embodiment of the present disclosure.

According to an embodiment, for the sake of explanations, FIG. 5B shows that an antenna module 500b includes one antenna element 565b (e.g., one antenna element of the antenna elements of FIG. 3A or one antenna element of the antenna elements of FIG. 3B or one antenna element of the antenna elements of FIG. 3C) included in an antenna structure 560b (e.g., the antenna structure 350a of FIG. 3A or the antenna structure 350b of FIG. 3B), and one transmission path, and/or one reception path (or a transmission chain, and/or a reception chain). In this case, it may be an antenna element (e.g., one antenna element of the antenna elements of FIG. 3B or one antenna element of the antenna elements of FIG. 3C) operating as a transmission antenna by electrically coupling to one transmission path (or transmission chain).

Referring to FIG. 5B, the antenna module 500b according to an embodiment may detect failure presence or absence using the chamber 490 and the reception antenna 530.

According to an embodiment, the antenna module 500b may include an RFIC 510b, and/or the antenna structure 560b. The antenna structure 560b may include at least one antenna element 561b. The RFIC 510b may include a transmission circuit corresponding to one transmission chain including a first split/combiner 521*a*, a TX power detector 541*a*, a first phase shifter 545*a*, a power amplifier 543*a*, a multi-frequency generator 511*a*, and/or a first mixer 513*a*.

The multi-frequency generator 511*a*, the first mixer 513*a*, the first split/combiner 521*a*, the first phase shifter 545*a*, the power amplifier 543*a*, or the TX power detector 541*a* of the components included in the antenna module 500*b* shown in FIG. 5B may perform substantially the same structures and operations as the components (e.g., the multi-frequency generator 511*a*, the first mixer 513*a*, the first split/combiner 521*a*, the first phase shifter 545*a*, the power amplifier 543*a*, or the TX power detector 541*a*) shown in FIG. 5A. Hence, explanations on detailed operations of the corresponding components shall be omitted.

Hereafter, various implementation examples according to the embodiment suggested in FIG. 5A shall be described by referring to FIGS. 6, 7, 8 and 9. However, various embodiments to be described by referring to FIG. 6 through FIG. 9 may be identically or similarly applied to the embodiment suggested in FIG. 5B. For example, the embodiment suggested in FIG. 5B may identically or similarly apply configurations and operations related to transmission to be described by referring to FIG. 6 through FIG. 9.

FIG. 6 through FIG. 9 to be explained in the following are diagrams illustrating an example of an antenna module 600 for providing self-testing by use of one multi-frequency generator, according to various embodiments.

Figure 6:
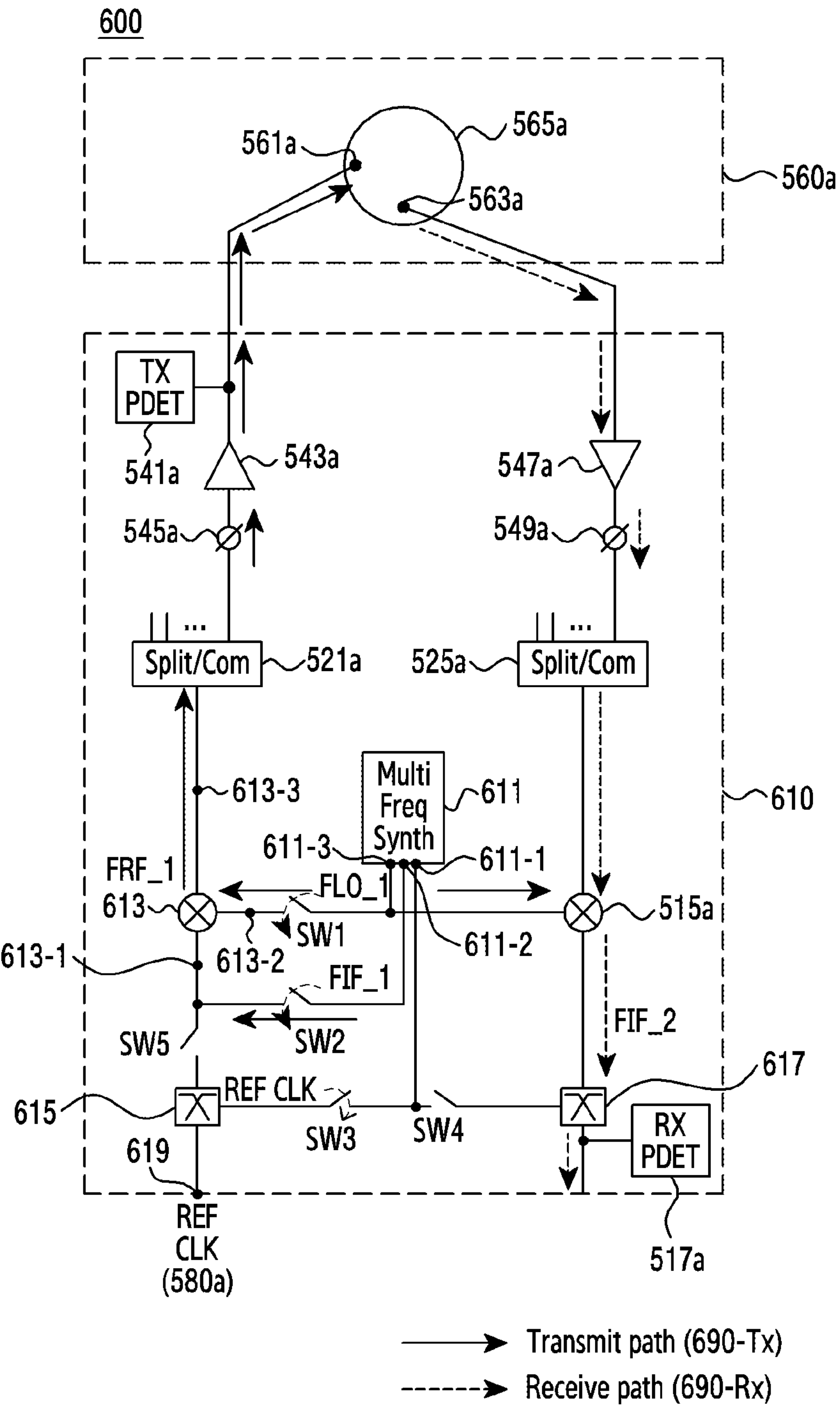
FIG. 6 is a diagram illustrating an example of an antenna module for providing self-testing by use of one multi-frequency generator, according to various embodiments.

Referring to FIG. 6, an RFIC 610 according to an embodiment may have a structure for generating an IF test transmission signal FIF_1 as the self-testing signal and a reference signal FLO_1, and outputting an RF test transmission signal FRF_1 by up-converting the IF test transmission signal FIF_1 by the reference signal FLO_1. The RFIC 610 may include a multi-frequency generator 611, a first mixer 613, a second mixer 515*a*, first through fifth switches sw1, sw2, sw3, sw4, and sw5, a first diplexer 615, a second diplexer 617, a TX power detector 541*a* and/or an RX power detector 517*a*. The TX power detector 541*a* may detect power of the RF test transmission signal output through the power amplifier 543*a*, and obtain performance and/or characteristics of the antenna module 600 by considering the detected RF test transmission signal power.

According to an embodiment, the first diplexer 615 may separate an IF signal (not shown) and a reference clock REF CLK 580*a* input through an input unit 619 of the antenna module 600. Since the IF signal is input to an IFIC (e.g., the fourth RFIC 228 of FIG. 2) in the electronic device (e.g., the electronic device 101 of FIG. 2) and the REF signal 580*a* is input through the same path in other frequency generator positioned in the electronic device, the first diplexer 615 may be electrically connected to the input unit. Since the IF signal is generated at the multi-frequency generator 611 positioned inside the antenna module 600 and is not input from outside of the antenna module 600, the first diplexer 615 may be omitted in the various embodiments of the present disclosure but is an essential component in the operations of the electronic device.

According to an embodiment, the multi-frequency generator 611 may generate the reference signal FLO_1 having the LO frequency by use of the reference clock REF CLK 580*a*, and/or the IF signal FIF_1 (e.g., the IF test transmission signal). The reference signal FLO_1 generated by the multi-frequency generator 611 may be provided to the first mixer 613 and the second mixer 515*a*. The IF test transmission signal FIF_1 generated by the multi-frequency generator 611 may be provided to the first mixer 613.

According to an embodiment, the multi-frequency generator 611 may include a first input stage 611-1, a first output stage 611-2, and a second output stage 611-3. For example, the multi-frequency generator 611 may receive the reference clock REF CLK 580*a* through the first input stage 611-1. The multi-frequency generator 611 may be electrically connected with the first mixer 613 or the second mixer 515*a* through the second output stage 611-3, and transmit the reference clock FLO_1 signal to the first mixer 613 or the second mixer 515*a*. The multi-frequency generator 611 may transmit the IF test transmission signal FIF_1 to the first mixer 613 through the first output stage 611-2.

According to an embodiment, the first mixer 613 may include a first port 613-1, a second port 613-2 and/or a third port 613-3. For example, the first mixer 613 may receive the IF test transmission signal FIF_1 through the first port 613-1. For example, the first port 613-1 may be electrically connected with the first output stage 611-2 of the multi-frequency generator 611. The first mixer 613 may receive the reference signal FLO_1 signal from the second output stage 611-3 of the multi-frequency generator 611 through the second port 611-2. For example, the second port 613-2 may be electrically connected with the second output stage 611-3. The first mixer 613 may transmit an RF signal FRF_1 to the first split/combiner 521*a* through the third port 613-3.

According to an embodiment, the first through fifth switches sw1, sw2, sw3, sw4, and sw5 may build a path for delivering the reference clock REF CLK 580*a* to the multi-frequency generator 611, and delivering the reference signal FLO_1 and the IF test transmission signal FIF_1 generated by the multi-frequency generator 611 to the first mixer 613. For example, the first through fifth switches sw1, sw2, sw3, sw4, and sw5 may include a single pole single throw (SPST) switch.

In an embodiment, the first switch sw1 may be positioned on the path interconnecting the second port 613-2 of the first mixer 613 and the second output stage 611-3 of the multi-frequency generator 611. The second switch sw2 may be positioned on the path interconnecting the first port 613-1 of the first mixer 613 and the first output stage 611-2 of the multi-frequency generator 611. The third switch sw3 may be positioned on the path interconnecting the input unit 619 to which the reference clock REF CLK 580*a* is input and the first input stage 611-1 of the multi-frequency generator 611. The fourth switch sw4 may be positioned on the path interconnecting the second diplexer 617 and the first input stage 611-1 of the multi-frequency generator 611. The fifth switch sw5 may be positioned on the path interconnecting the first diplexer 615 and the first port 613-1 of the first mixer 613. In an embodiment, the first output stage 611-2 of the multi-frequency generator 611 may be electrically connected with the path interconnecting the first port 613-3 of the first mixer 613 and the fifth switch sw5. The fourth switch sw4 may be positioned on the path interconnecting the second diplexer 617 and the first output stage 611-2 of the multi-frequency generator 611.

For example, in the self-testing, the first switch sw1, the second switch sw2, and the third switch sw3 may be turned on, and the fourth switch sw4 and the fifth switch sw5 may be turned off. In an embodiment, the third switch sw3 or the fourth switch sw4 may be exclusively turned on or off. For example, if the RF test transmission signal is delivered to the first feed 561*a*, the third switch sw3 may be turned on and the fourth switch sw4 may be turned off. As another example, if the RF test transmission signal is delivered to the second feed 563*a*, the fourth switch sw4 may be turned on and the third switch sw3 may be turned off. For example, if the third switch sw3 is turned on and the fourth switch sw4 is turned off, a path for providing the reference clock REF_CLK 580*a* to the multi-frequency generator 611 may be built. If the first switch sw1 is turned on, the path for delivering the reference signal FLO_1 generated by the multi-frequency generator 611 to the first mixer 613 may be built. If the second switch sw2 is turned on, the path for delivering the IF test transmission signal FIF_1 generated by the multi-frequency generator 611 to the first mixer 613 may be built. If the fifth switch sw5 is turned off, the path for delivering a signal (e.g., the reference clock REF_CLK 580*a*) provided from a processor (e.g., the first or second communication processor 212 or 214 of FIG. 2) to the first mixer 613 may be blocked.

In an embodiment, if the first switch sw1, the second switch sw2, and the third switch sw3 may be turned on, and the fourth switch sw4 and the fifth switch sw5 are turned off, the first mixer 613 may receive the reference signal FLO_1 and the IF test transmission signal FIF_1 from the multi-frequency generator 611, and generate the RF signal FRF_1 (e.g., the RF test transmission signal) by up-converting the IF test transmission signal FIF_1 using the reference signal FLO_1. In an embodiment, the third switch sw3 or the fourth switch sw4 may be exclusively turned on or off.

In an embodiment, if the first switch sw1, the second switch sw2, and the third switch sw3 may be turned on, and the fourth switch sw4 and the fifth switch sw5 are turned off, the second mixer 515*a* may receive the reference signal FLO_1 from the multi-frequency generator 611, and receive an RF signal (e.g., an RF test reception signal) from the second split/combiner circuit 525*a*. In this case, the second mixer 515*a* may generate an IF test reception signal FIF_2 by down-converting the RF signal (e.g., the RF test reception signal) using the reference signal FLO_1. In an embodiment, the third switch sw3 or the fourth switch sw4 may be exclusively turned on or off.

Figure 7:
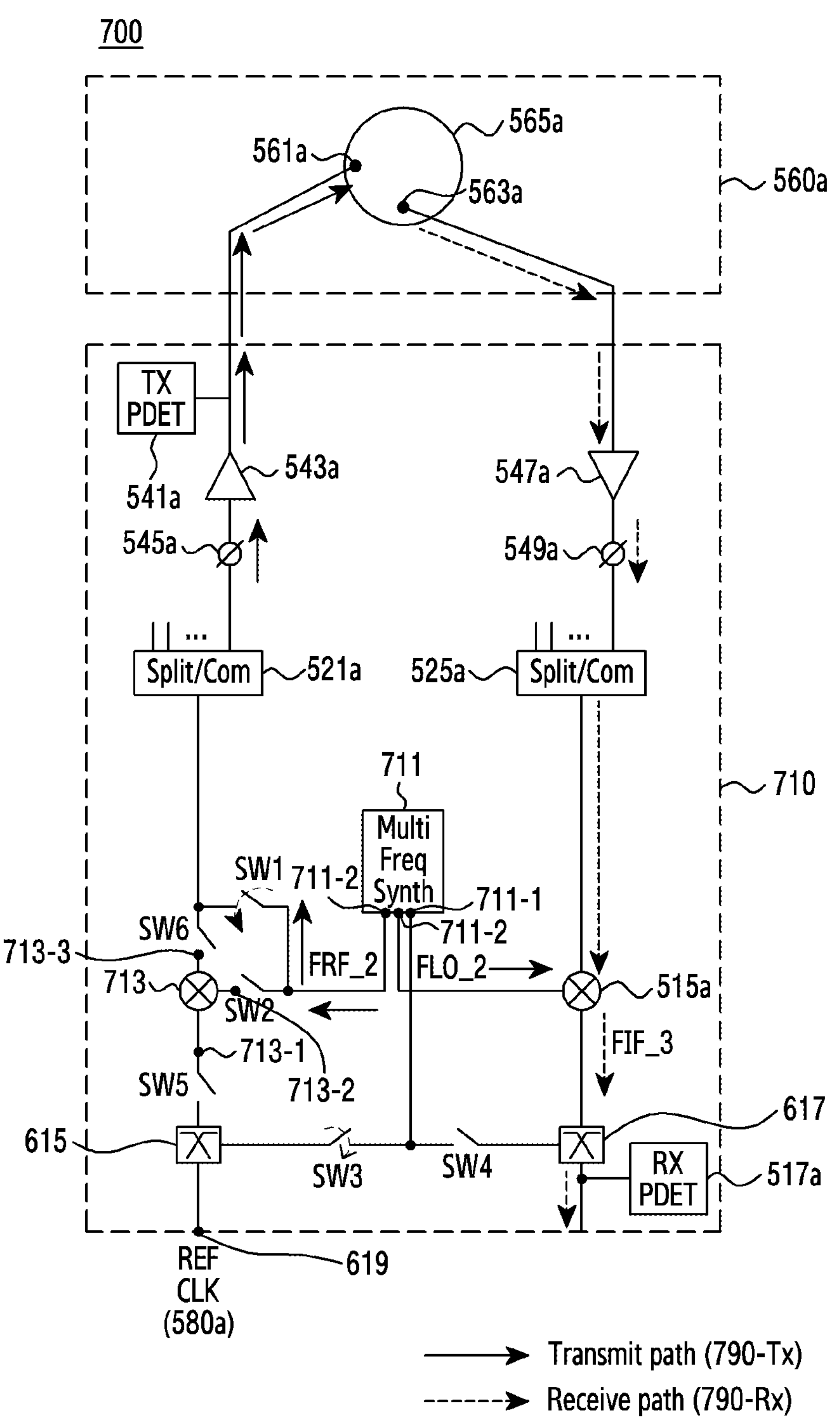
FIG. 7 is a diagram illustrating an example of an antenna module for providing self-testing by use of one multi-frequency generator, according to various embodiments.

FIG. 7 is a diagram illustrating an example of an antenna module 700 for providing self-testing by use of one multi-frequency generator, according to various embodiments.

Referring to FIG. 7, an RFIC 710 according to an embodiment may have a structure for generating an RF test transmission signal FRF_2 as the self-testing signal, and outputting the generated RF test transmission signal FRF_2. The RFIC 710 may include a multi-frequency generator 711, a first mixer 713, a second mixer 515*a*, first through sixth switches sw1, sw2, sw3, sw4, sw5 and sw6, an RX power detector 517*a*, a first diplexer 615, a second diplexer 617, and/or a TX power detector 541*a*. The TX power detector 541*a* may detect power of the RF test transmission signal output through the power amplifier 543*a*, and obtain performance and/or characteristics of the antenna module 700 by considering the detected RF test transmission signal power.

According to an embodiment, the multi-frequency generator 711 may generate a reference signal FLO_2 having the LO frequency by use of a reference clock REF CLK 580*a*, and/or the RF signal FRF_2 (e.g., the RF test transmission signal). The RF signal FRF_2 (e.g., the RF test transmission signal) generated by the multi-frequency generator 711 may be provided as the output of the first mixer 713. The reference signal FLO_2 generated by the multi-frequency generator 711 may be provided to the second mixer 515*a*.

According to an embodiment, the multi-frequency generator 711 may include a first input stage 711-1, a first output stage 711-2, and a second output stage 711-3. For example, the multi-frequency generator 711 may receive the reference clock REF CLK 580*a* through the first input stage 711-1. The multi-frequency generator 711 may be electrically connected with the first split/combiner 521*a* via the first mixer 713 through the second output stage 711-3, and transmit the RF signal FRF_2 to the first split/combiner 521*a*. The multi-frequency generator 711 may transmit an LO signal FLO_2 to the second mixer 515*a* through the first output stage 711-2.

According to an embodiment, the first through sixth switches sw1, sw2, sw3, sw4, sw5, and sw6 may build a path for delivering the reference clock REF CLK 580*a* to the multi-frequency generator 711, a path for delivering the RF test transmission signal FRF_2 generated by the multi-frequency generator 711 to the first split/combiner 521*a* and a path for delivering the reference signal FLO_2 generated by the multi-frequency generator 711 to the second mixer 515*a*. For example, the first through sixth switches sw1, sw2, sw3, sw4, sw5, and sw6 may include an SPST switch.

According to an embodiment, the first mixer 713 may include a first port 713-1, a second port 713-2 and/or a third port 713-3. The first switch sw1 may be positioned on the path interconnecting the second output stage 711-3 of the multi-frequency generator 711 and the first split/combiner 521*a*. For example, it may be positioned on the path connecting the first split/combiner 521*a* via the third port 713-3 of the first mixer 713. The second switch sw2 may be positioned on the path interconnecting the second output stage 711-3 of the multi-frequency generator 711 and the second port 713-2 of the first mixer 713. The third switch sw3 may be positioned on the path interconnecting an input unit 619 to which the reference clock REF CLK 580*a* is input and the first input stage 711-1 of the multi-frequency generator 711. The fourth switch sw4 may be positioned on the path interconnecting the second diplexer 617 and the first input stage 711-1 of the multi-frequency generator 711. The fifth switch sw5 may be positioned on the path interconnecting the first diplexer 615 and the first port 713-1 of the first mixer 713. The sixth switch sw6 may be positioned on the path interconnecting the third port 713-3 of the first mixer 713 and the first split/combiner 521*a*.

According to an embodiment, in the self-testing, the first switch sw1 and/or the third switch sw3 may be turned on, and the second switch sw2, the fourth switch sw4, the fifth switch sw5 and/or the sixth switch sw6 may be turned off. In an embodiment, the third switch sw3 or the fourth switch sw4 may be exclusively turned on or off. For example, if the RF test transmission signal is delivered to the first feed 561*a*, the third switch sw3 may be turned on and the fourth switch sw4 may be turned off. As another example, if the RF test transmission signal is delivered to the second feed 563*a*, the fourth switch sw4 may be turned on and the third switch sw3 may be turned off. For example, if the third switch sw3 is turned on and the fourth switch sw4 is turned off, a path for providing the reference clock REF_CLK 580*a* to the multi-frequency generator 711 may be established. If the first switch sw1 is turned on and the second switch sw2 and the sixth switch sw6 are turned off, the RF test transmission signal FRF_2 generated by the multi-frequency generator 711 is not directly delivered to the first mixer 713 and a path for delivering to the first split/combiner 521*a* may be built.

In an embodiment, if the first switch sw1 and/or the third switch sw3 may be turned on, and the second switch sw2, the fourth switch sw4, the fifth switch sw5 and/or the sixth switch sw6 are turned off, the RF test transmission signal FRF_2 generated by the multi-frequency generator 711 may be delivered to the first split/combiner 521*a*.

In an embodiment, if the first switch sw1 and/or the third switch sw3 may be turned on, and the second switch sw2, the fourth switch sw4, the fifth switch sw5 and/or the sixth switch sw6 are turned off, the second mixer 515*a* may receive the reference signal FLO_2 from the multi-frequency generator 711, and receive an RF signal (e.g., an RF test reception signal) from the second split/combiner circuit 525*a*. In this case, the second mixer 515*a* may generate an IF test reception signal FIF_3 by down-converting the RF signal (e.g., the RF test reception signal) using the reference signal FLO_2.

Figure 8:
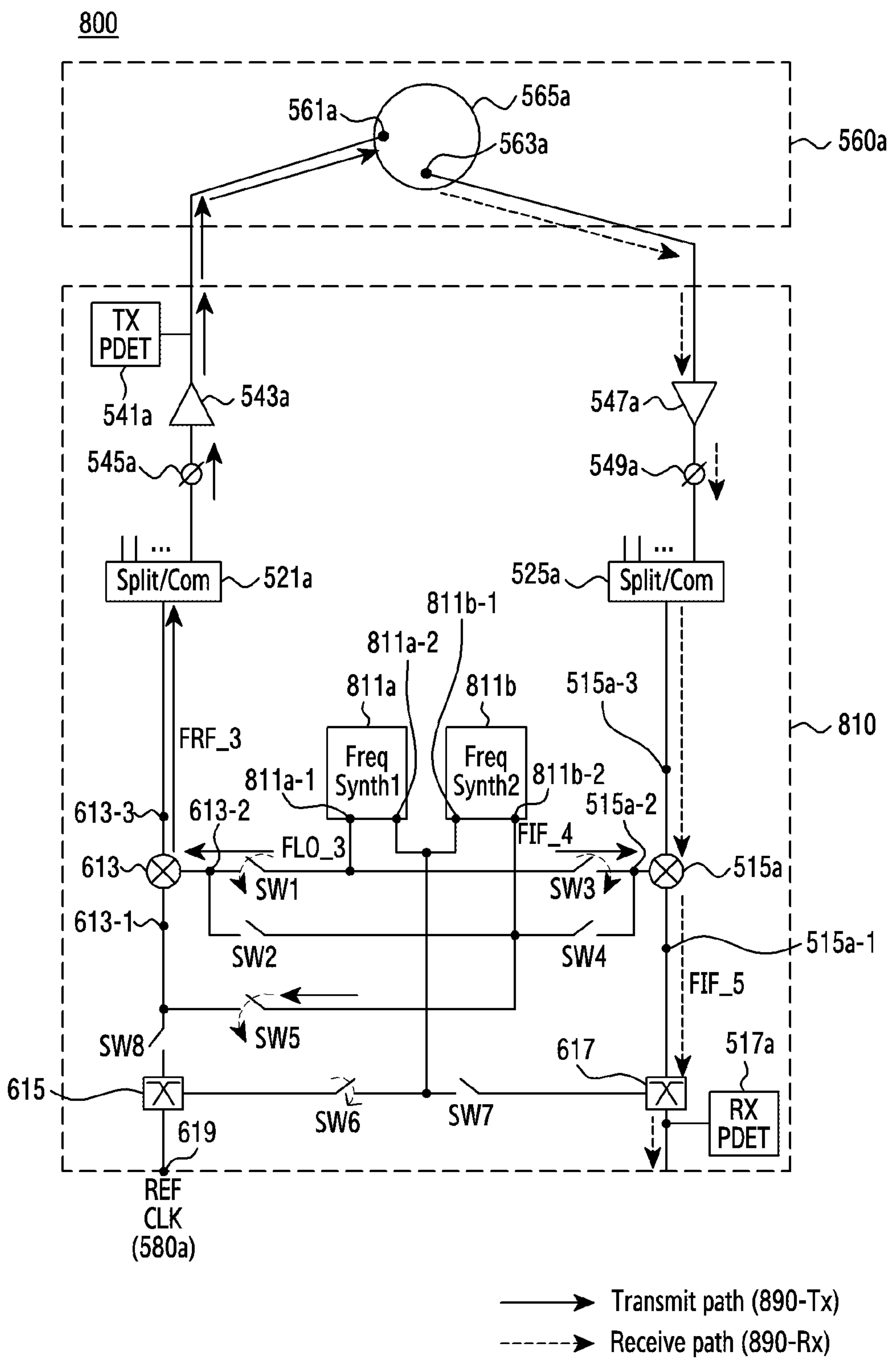
FIG. 8 is a diagram illustrating an example of an antenna module for providing self-testing by use of two frequency generators, according to various embodiments.

FIG. 8 is a diagram illustrating an example of an antenna module 800 for providing self-testing by use of two frequency generators, according to various embodiments.

Referring to FIG. 8, an RFIC 810 according to an embodiment may have a structure for generating an IF test transmission signal FIF_4 as the self-testing signal and a reference signal FLO_3, and outputting an RF test transmission signal FRF_3 by up-converting the IF test transmission signal FIF_4 by the reference signal FLO_3. The RFIC 810 may include first and second frequency generators 811*a* and 811*b*, first and second mixers 613 and 515*a*, first through eighth switches sw1, sw2, sw3, sw4, sw5, sw6, sw7, and sw8, a first diplexer 615, a second diplexer 617, a TX power detector 541*a*, and/or an RX power detector 517*a*. The TX power detector 541*a* may detect power of the RF test transmission signal output through the power amplifier 543*a*, and obtain performance and/or characteristics of the antenna module 800 by considering the detected RF test transmission signal power.

According to an embodiment, the first frequency generator 811*a* may generate the reference signal FLO_3 having the LO frequency by use of the reference clock REF CLK 580*a*. The second frequency generator 811*b* may generate IF test transmission signal FIF_4 (e.g., an IF signal) using the reference clock REF CLK 580*a*. The reference signal FLO_3 generated by the first frequency generator 811*a* may be provided to the first mixer 613, or the second mixer 515*a*. The IF test transmission signal FIF_4 generated by the second frequency generator 811*b* may be provided to the first mixer 613 or the second mixer 515*a*.

According to an embodiment, the first frequency generator 811*a* may include a first output stage 811*a*-1, and/or a first input stage 811*a*-2. For example, the first frequency generator 811*a* may receive the reference clock REF CLK 580*a* through the first input stage 811*a*-2. The first frequency generator 811*a* may be electrically connected with the first mixer 613 or the second mixer 515*a* through the first output stage 811*a*-*a*, and transmit the reference signal FLO_3 to the first mixer 613 or the second mixer 515*a*.

According to an embodiment, the second frequency generator 811*b* may include a first input stage 811*b*-1, and/or a first output stage 811*b*-2. For example, the second frequency generator 811*b* may receive the reference clock REF CLK 580*a* through the first input stage 811*b*-1. The second frequency generator 811*b* may transmit the IF test transmission signal FIF_4 to the first mixer 613 through the first output stage 811*b*-2.

According to an embodiment, the first mixer 613 may include a first port 613-1, a second port 613-2, and/or a third port 613-3. For example, the first mixer 613 may receive the IF test transmission signal FIF_4 through the first port 613-1. For example, the first port 613-1 may be electrically connected with the first output stage 811*b*-2 of the second frequency generator 811*b*. The first mixer 613 may receive the reference signal FLO_3 from the first output stage 811*a*-1 of the first frequency generator 811*a* through the second port 611-2. For example, the second port 611-2 may be electrically connected with the first output stage 811*a*-1. The first mixer 613 may transmit the RF signal FRF_3 to the first split/combiner 521*a* through the third port 613-3.

According to an embodiment, the second mixer 515*a* may include a first port 515*a*-1, a second port 515*a*-2 and/or a third port 515*a*-3. For example, the second mixer 515*a* may receive a test transmission signal from the second split/combiner 525*a* through the third port 515*a*-3. The first port 515*a*-1 may output an IF test transmission signal FIF_5, and may be connected with the second diplexer 617. The second port 515*a*-2 may be electrically connected with the first output stage 811*a*-1 of the first frequency generator 811*a*. the second mixer 515*a* may receive the reference signal FLO_3 from the first output stage 811*a*-1 of the first frequency generator 811*a* through the second port 515*a*-2.

According to an embodiment, the first through eighth switches sw1, sw2, sw3, sw4, sw5, sw6, sw7, and sw8 may build a path for delivering the reference clock REF CLK 580*a* to the first frequency generator 811*a*, or the second frequency generator 811*b*, a path for delivering the reference signal FLO_3 generated by the first frequency generator 811*a* to the first mixer 613, or the second mixer 515*a* and a path for delivering the IF test transmission signal FIF_4 generated by the second frequency generator 811*b* to the first mixer 613. For example, the first through eighth switches sw1, sw2, sw3, sw4, sw5, sw6, sw7, and sw8 may include an SPST switch.

According to an embodiment, the first switch sw1 may be positioned on the path interconnecting the first output stage 811*a*-1 of the first frequency generator 811*a* and the second port 613-2 of the first mixer 613. The second switch sw2 may be positioned on the path interconnecting the first output stage 811*b*-1 of the second frequency generator 811*b* and the second port 613-2 of the first mixer 613. The third switch sw3 may be positioned on the path interconnecting the first output stage 811*a*-1 of the first frequency generator 811*a* and the second port 515*a*-2 of the second mixer 515*a*. The fourth switch sw4 may be positioned on the path interconnecting the first output stage 811*b*-2 of the second frequency generator 811*b* and the second port 515*a*-2 of the second mixer 515*a*. The fifth switch sw5 may be positioned on the path interconnecting the first output stage 811*b*-2 of the second frequency generator 811*b* and the first port 613-1 of the first mixer 613. The sixth switch sw6 may be positioned on the common path interconnecting an input unit to which the reference clock REF CLK 580*a* is input and the first input stage 811*a*-2 of the first frequency generator 811*a* and/or the first input stage 811*b*-1 of the second frequency generator 811*b*. The seventh switch sw7 may be positioned on the common path interconnecting the second diplexer 617 and the first input stage 811*a*-2 of the first frequency generator 811*a* and/or the first input stage 811*b*-1 of the second frequency generator 811*b*. The eighth switch sw8 may be positioned on the path interconnecting the first diplexer 615 and the first port 613-1 of the first mixer 613.

According to an embodiment, in the self-testing, the first switch sw1, the third switch sw3, the fifth switch sw5 and the sixth switch sw6 may be turned on, and the second switch sw2, the fourth switch sw4, the seventh switch sw7 and the eighth switch sw8 may be turned off. In an embodiment, the sixth switch sw6 or the seventh switch sw7 may be exclusively turned on or off. For example, if the RF test transmission signal is delivered to the first feed 561*a*, the sixth switch sw6 may be turned on and the seventh switch sw7 may be turned off. As another example, if the RF test transmission signal is delivered to the second feed 563*a*, the seventh switch sw7 may be turned on and the sixth switch sw6 may be turned off. For example, if the sixth switch sw6 is turned on and the seventh switch sw7 is turned off, the path for providing the reference clock REF_CLK 580*a* to the first and second frequency generators 811*a* and 811*b* may be established. If the first switch sw1 or the third switch sw3 is turned on and the second switch sw2 and the fourth switch sw4 are turned off, the path for delivering the reference signal FLO_3 generated by the first frequency generator 811*a* to the first and second mixers 613 and 515*a* may be established. If the fifth switch sw5 is turned on and the second switch sw2 and the fourth switch sw4 are turned off, the path for delivering the IF test transmission signal FIF_4 generated by the second frequency generator 811*b* to the first mixer 613 may be established. If the eighth switch sw8 is turned off, the path for delivering a signal (e.g., the reference clock REF_CLK 580*a*) provided from a processor (e.g., the first or second communication processor 212 or 214 of FIG. 2) to the first mixer 613 may be blocked.

According to embodiment, if the first switch sw1, the third switch sw3, the fifth switch sw5 and the sixth switch sw6 may be turned on, and the second switch sw2, the fourth switch sw4, the seventh switch sw7 and the eighth switch sw8 are turned off, the first mixer 613 may receive the reference signal FLO_3 from the first frequency generator 811*a*, receive the IF test transmission signal FIF_4 from the second frequency generator 811*b*, and generate the RF test transmission signal FRF_3 (e.g., the RF signal) by up-converting IF test transmission signal FIF_4 using the reference signal FLO_3. In an embodiment, the sixth switch sw6 or the seventh switch sw7 may be exclusively turned on or off.

According to embodiment, if the first switch sw1, the third switch sw3, the fifth switch sw5 and the sixth switch sw6 may be turned on, and the second switch sw2, the fourth switch sw4, the seventh switch sw7 and the eighth switch sw8 are turned off, the second mixer 515*a* may receive the reference signal FLO_3 from the first frequency generator 811*a*, and receive an RF signal (e.g., an RF test reception signal) from the second split/combiner 525*a*. In this case, the second mixer 515*a* may generate the IF test reception signal FIF_5 by down-converting the RF signal (e.g., the RF test reception signal) using the reference signal FLO_3. In an embodiment, the sixth switch sw6 or the seventh switch sw7 may be exclusively turned on or off.

According to embodiment, if the first switch sw1, the fourth sw4, the fifth switch sw5 and the sixth switch sw6 may be turned on, and the second switch sw2, the third switch sw3, the seventh switch sw7 and the eighth switch sw8 are turned off, the second mixer 515*a* may receive the IF test transmission signal FIF_4 from the second frequency generator 811*b*, and receive the RF signal (e.g., the RF test reception signal) from the second split/combiner 525*a*. In this case, the second mixer 515*a* may generate a reference signal (not shown) by down-converting the RF signal (e.g., the RF test reception signal) using the IF test transmission signal FIF_4.

Figure 9:
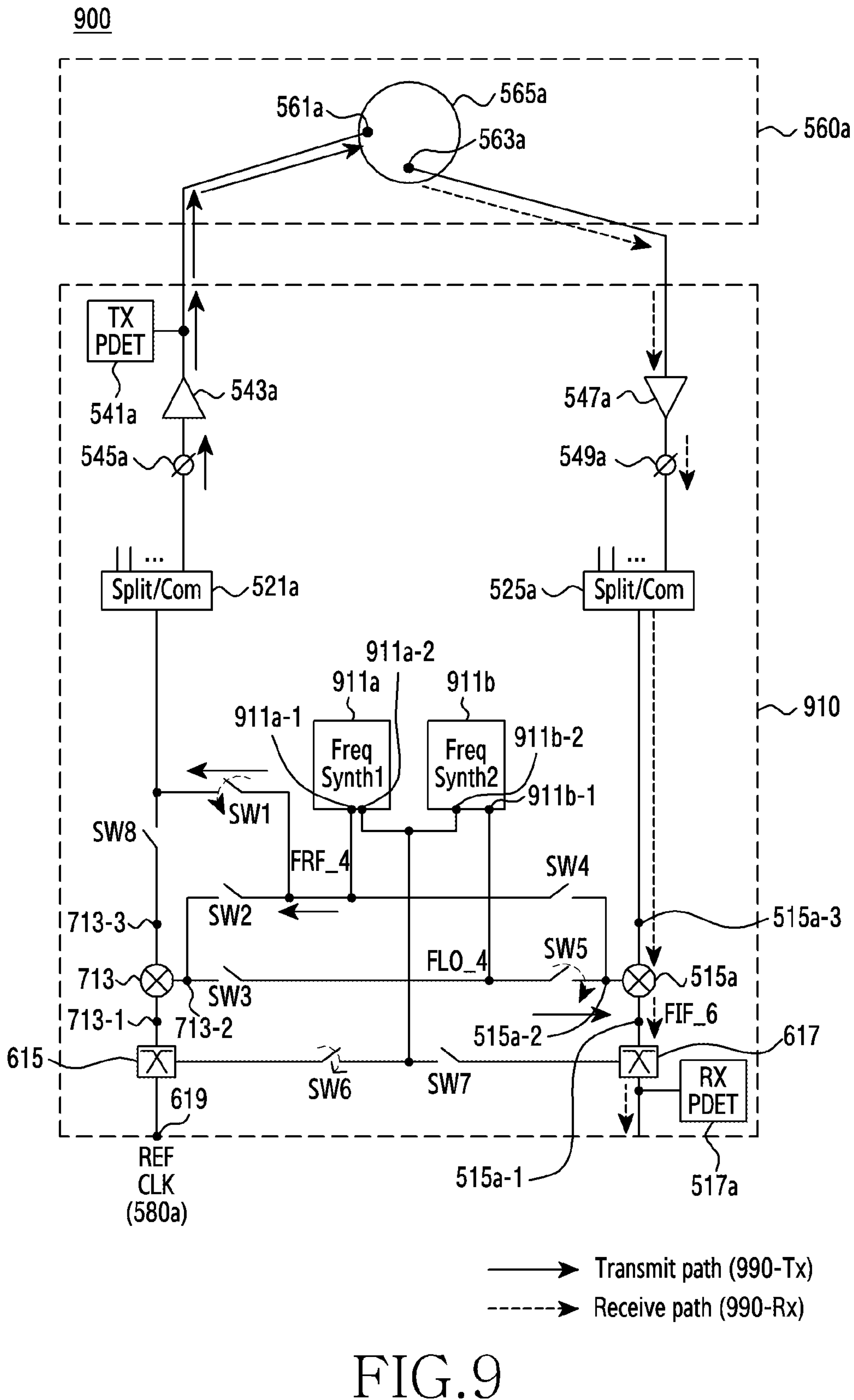
FIG. 9 is a diagram illustrating an example of an antenna module for providing self-testing by use of two frequency generators, according to various embodiments.

FIG. 9 is a diagram illustrating an example of an antenna module 900 for providing self-testing by use of two frequency generators, according to various embodiments.

Referring to FIG. 9, an RFIC 910 according to an embodiment may have a structure for generating an RF test transmission signal FRF_4 as the self-testing signal, and outputting the generated RF test transmission signal FRF_4. The RFIC 910 may include first and second frequency generators 911*a* and 911*b*, first and second mixers 713 and 515*a*, first through eighth switches sw1, sw2, sw3, sw4, sw5, sw6, sw7, and sw8, a first diplexer 615, a second diplexer 617, a TX power detector 541*a* and/or an RX power detector 517*a*. The TX power detector 541*a* may detect power of the RF test transmission signal output through the power amplifier 543*a*, and obtain performance and/or characteristics of the antenna module 900 by considering the detected RF test transmission signal power.

According to an embodiment, the first frequency generator 911*a* may generate an RF signal FRF_4 (e.g., an RF test transmission signal) using the reference clock REF CLK 580*a*. The first frequency generator 911*b* may generate a reference signal FLO_4 having the LO frequency using the reference clock REF CLK 580*a*. The RF test transmission signal FRF_4 generated by the first frequency generator 911*a* may be provided to the first split/combiner 521*a*. The reference signal FLO_4 generated by the second frequency generator 911*b* may be provided to the first mixer 713, or the second mixer 515*a*.

According to an embodiment, the first frequency generator 911*a* may include a first output stage 911*a*-1, and/or a first input stage 911*a*-2. For example, the first frequency generator 911*a* may receive the reference clock REF CLK 580*a* through the first input stage 911*a*-2. The first frequency generator 911*a* may be electrically connected to the first split/combiner 521*a* by way of the first mixer 713 through the first output stage 911*a*-1, and transmit the RF test transmission signal FRF_4 to the first split/combiner 521*a*.

According to an embodiment, the second frequency generator 911*b* may include a first input stage 911*b*-1, and/or a first output stage 911*b*-2. For example, the second frequency generator 911*b* may receive the reference clock REF CLK 580*a* through the first input stage 911*b*-1. The second frequency generator 911*b* may transmit the reference signal FLO_4 to the second mixer 613 through the first output stage 911*b*-1.

According to an embodiment, the first through eighth switches sw1, sw2, sw3, sw4, sw5, sw6, sw7, and sw8 may build a path for delivering the reference clock REF CLK 580*a* to the first and second frequency generators 911*a* and 911*b*, a path for delivering the RF test transmission signal FRF_4 generated by the first frequency generator 911*a* to the first mixer 713 or the first split/combiner 521*a* and a path for delivering the reference signal FLO_4 generated by the second frequency generator 911*b* to the first mixer 713 or the second mixer 515*a*. For example, the first through sixth switches sw1, sw2, sw3, sw4, sw5, and sw6 may include an SPST switch.

According to an embodiment, the first mixer 713 may include a first port 713-1, a second port 713-2 and/or a third port 713-3. The first switch sw1 may be positioned on the path interconnecting the first output stage 911*a*-1 of the first frequency generator 911*a* and the first split/combiner 521*a*. The second switch sw2 may be positioned on the path interconnecting the first output stage 911*a*-1 of the first frequency generator 911*a* and the second port 713-2 of the first mixer 713. The third switch sw3 may be positioned on the path interconnecting the first output stage 911*b*-1 of the second frequency generator 911*b* and the second port 713-2 of the first mixer 713. The fourth switch sw4 may be positioned on the path interconnecting the first output stage 911*a*-1 of the first frequency generator 911*a* and the second port 515*a*-2 of the second mixer 515*a*. The fifth switch sw5 may be positioned on the path interconnecting the first output stage 911*b*-1 of the second frequency generator 911*b* and the second port 515*a*-2 of the second mixer 515*a*. The sixth switch sw6 may be positioned on the common path interconnecting an input unit 619 to which the reference clock REF CLK 580*a* is input and the first input stage 911*a*-2 of the first frequency generator 911*a* and/or the first input stage 911*b*-2 of the second frequency generator 911*b*. The seventh switch sw7 may be positioned on the common path interconnecting the second diplexer 617 and the first input stage 911*a*-2 of the first frequency generator 911*a* and/or the first input stage 911*b*-2 of the second frequency generator 911*b*. The eighth switch sw8 may be positioned on the path interconnecting the third port 717-3 of the first mixer 717 and the first split/combiner 521*a*.

According to an embodiment, in the self-testing, the first switch sw1, the fifth switch sw5 and the sixth switch sw6 may be turned on, and the second switch sw2, the third switch sw3, the fourth switch sw4, the seventh switch sw7 and the eighth switch sw8 may be turned off. In an embodiment, the sixth switch sw6 or the seventh switch sw7 may be exclusively turned on or off. For example, if the RF test transmission signal is delivered to the first feed 561*a*, the sixth switch sw6 may be turned on and the seventh switch sw7 may be turned off. As another example, if the RF test transmission signal is delivered to the second feed 563*a*, the seventh switch sw7 may be turned on and the sixth switch sw6 may be turned off. For example, if the sixth switch sw6 is turned on and the seventh switch sw7 is turned off, the path for providing the reference clock REF_CLK 580*a* to the first and second frequency generators 911*a* and 911*b* may be established. If the first switch sw1 is turned on, and the second switch sw2, the third switch sw3 and the fourth switch sw4 are turned off, the path for delivering the RF test transmission signal FRF_4 generated by the first frequency generator 911*a* to the first split/combiner 521*a* may be established. If the fifth switch sw5 is turned on and the third switch sw3 is turned off, the path for delivering the reference signal FLO_4 generated by the second frequency generator 911*b* to the second mixer 515*a* may be established. If the eighth switch sw8 is turned off, the path for delivering a transmission signal provided from a processor (e.g., the first or second communication processor 212 or 214 of FIG. 2) may be blocked.

According to embodiment, if the first switch sw1, the fifth switch sw5 and the sixth switch sw6 may be turned on, and the second switch sw2, the third switch sw3, the fourth switch sw4, the seventh switch sw7 and the eighth switch sw8 are turned off, the RF test transmission signal FRF_4 generated by the first frequency generator 911*a* may be delivered to the first split/combiner 521*a*. In an embodiment, the sixth switch sw6 or the seventh switch sw7 may be exclusively turned on or off.

According to embodiment, if the first switch sw1, the fifth switch sw5 and the sixth switch sw6 may be turned on, and the second switch sw2, the third switch sw3, the fourth switch sw4, the seventh switch sw7 and the eighth switch sw8 are turned off, the second mixer 515*a* may receive the reference signal FLO_4 from the second frequency generator 911*b*, and receive an RF signal (e.g., an RF test reception signal) from the second split/combiner 525*a*. In this case, the second mixer 515*a* may generate an IF test reception signal FIF_6 by down-converting the RF signal (e.g., the RF test reception signal) using the reference signal FLO_4.

Figure 10:
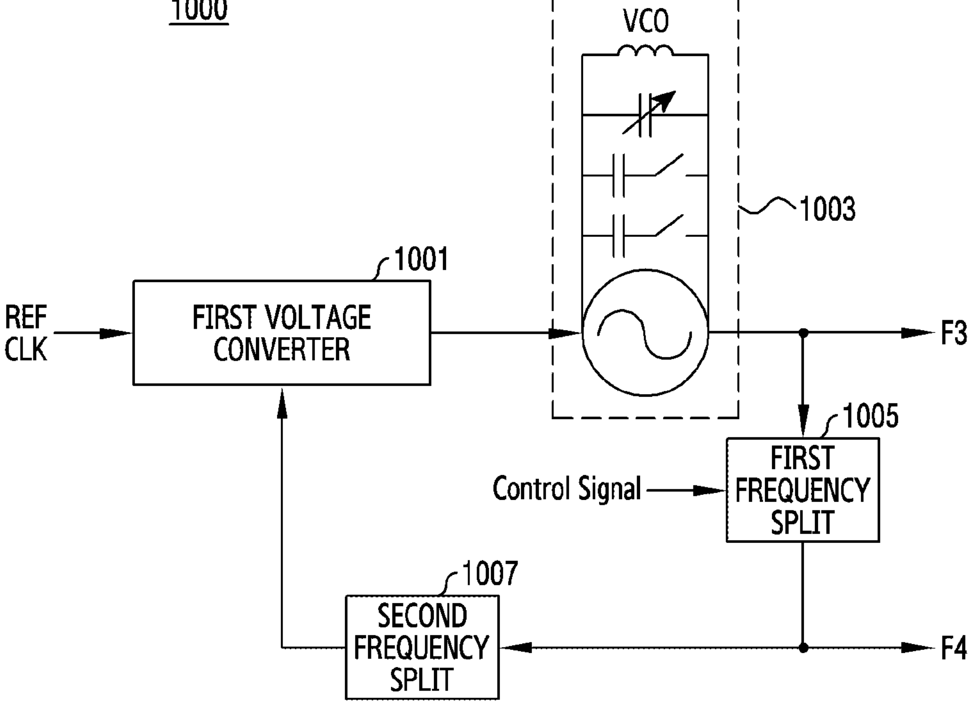
FIG. 10 is a block diagram illustrating an example multi-frequency generator including one voltage controlled oscillator, according to various embodiments.

FIG. 10 is a block diagram illustrating an example configuration of a multi-frequency generator (e.g., FIG. 5, FIG. 6, and FIG. 7) including one voltage controlled oscillator, according to various embodiments.

Referring to FIG. 10, a multi-frequency generator 1000 according to an embodiment may include a first voltage converter 1001, a first voltage controlled oscillator 1003, a first frequency split 1005, and/or a second frequency split 1007.

According to an embodiment, the first voltage converter 1001 may receive a reference clock REF CLK, and convert the phase or the frequency of the reference clock REF CLK to the voltage. If the reference clock REF CLK input to the first voltage converter 1001 and a feedback signal are locked, the multi-frequency generator 1000 may output a signal having a specific frequency. The feedback signal may be an output signal of the second frequency split 1007.

According to an embodiment, the first voltage controlled oscillator 1003 may generate a signal having a frequency linearly proportional to the signal output by the first voltage converter 1001. A signal output by the first voltage controlled oscillator 1003 may be a first output F3 of the multi-frequency generator 1000.

According to an embodiment, the first frequency split 1005 may 1-multiply the frequency of the first output F3 by a control signal, and the 1-multiplied signal may be provided as a second output F4 and an input of the second frequency split 1007. A division ratio of the first frequency split 1005 may be, for example, $$\frac{1}{2} \text{ or } \frac{1}{3}.$$

For example, the division ratio may differ according to the control signal. The output signal according to the division ratio of the first frequency split 1005 may be the second output F4 of the multi-frequency generator 1000. According to an example, the second output F4 may be $$\frac{1}{2}F3 \text{ or } \frac{1}{3}F3.$$

According to an embodiment, the second frequency split 1007 may 2-multiply the signal output by the first frequency split 1005 and provide as a feedback signal of the first voltage converter 1001. The division ratio of the second frequency split 1007 may be $$\frac{1}{M}$$

(where, M is a positive integer). The second frequency split 1007 may receive, for example, the signal having the frequency divided by the first frequency split 1005 and divide the voltage with the arbitrary integer value M. The frequency signal divided (output) by the second frequency split 1007 may be provided as a feedback signal of the first voltage converter 1001.

As stated above, if the output signal of the second frequency split 1007 is compared with the reference clock, and the reference clock and the frequency of the output signal of the second frequency split 1007 are locked, the multi-frequency generator 1000 may output a signal having a specific frequency.

According to an embodiment, since the reference clock and the second frequency split 1007 need to be locked to generate a specific frequency, the specific frequency may be generated by changing the reference clock. The reference clock may be changed by the board 450 (e.g., an FPGA board). To acquire an intended frequency by the multi-frequency generator 1000, it may be acquired by changing the reference clock or changing the M value.

Figure 11:
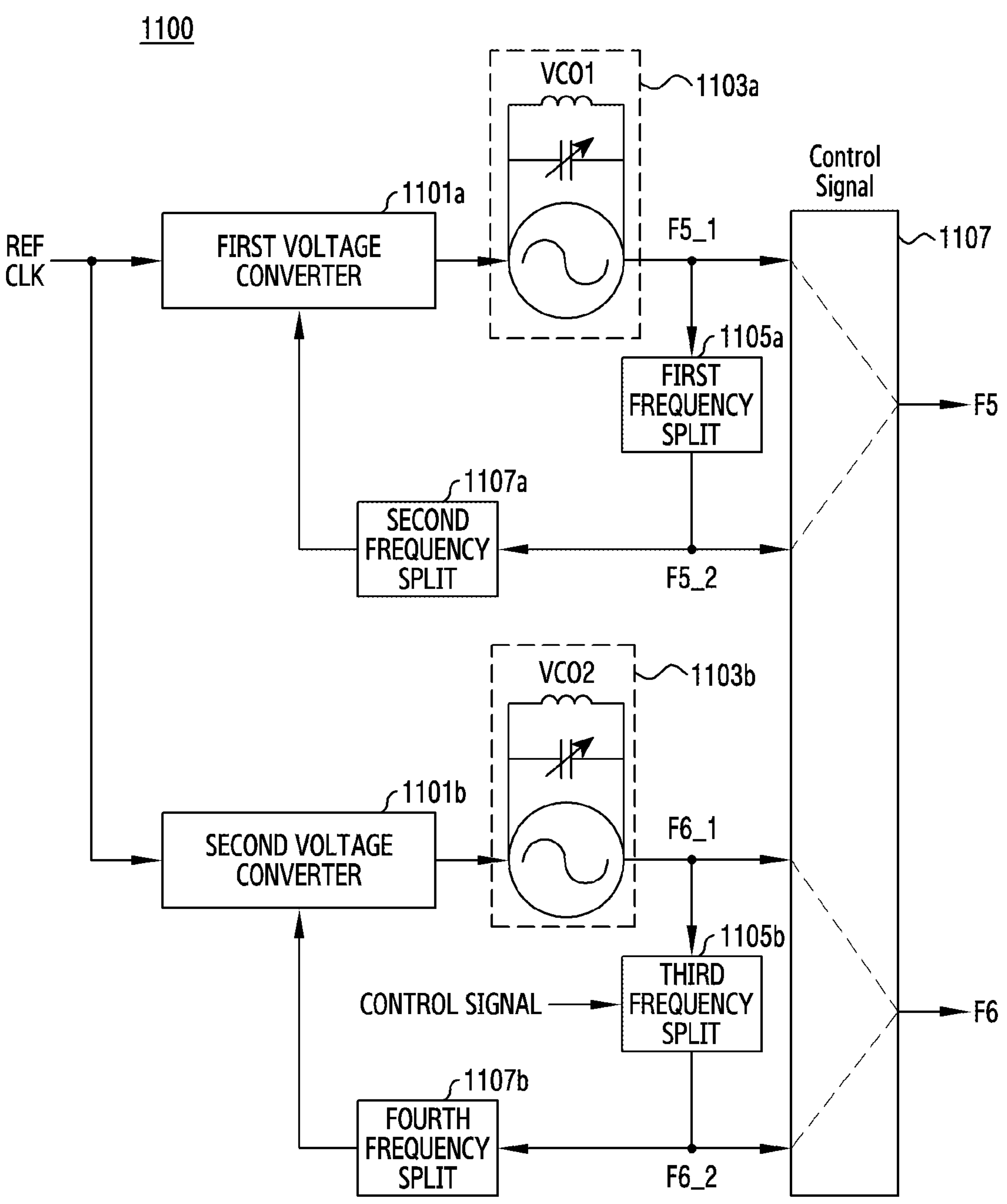
FIG. 11 is a block diagram illustrating an example multi-frequency generator including two voltage controlled oscillators, according to various embodiments.

FIG. 11 is a block diagram illustrating an example configuration of a multi-frequency generator (e.g., FIG. 5, FIG. 6, and FIG. 7) including two voltage controlled oscillators, according to various embodiments.

Referring to FIG. 11, according to an embodiment, a multi-frequency generator 1100 may include a first voltage converter 1101*a*, a second voltage converter 1101*b*, a first voltage controlled oscillator 1103*a*, a second voltage controlled oscillator 1103*b*, a first frequency split 1105*a*, a second frequency split 1107*a*, a third frequency split 1105*b*, and/or a fourth frequency split 1107*b*.

According to an embodiment, the first voltage converter 1101*a* and the second voltage converter 1101*b* may convert the phase or the frequency to the voltage. If a reference clock REF CLK and a feedback signal input to the first voltage converter 1101*a* and the second voltage converter 1101*b* are locked, the multi-frequency generator 1100 may output a signal having a specific frequency. Herein, the feedback signal indicates a signal output from the second frequency split 1107*a* and the fourth frequency split 1107*b*.

According to an embodiment, the first voltage controlled oscillator 1103*a* may generate a signal having a frequency in linear proportion to the input signal. A signal output by the first voltage controlled oscillator 1103*a* may be a third output F5_1 of the multi-frequency generator 1100. The second voltage controlled oscillator 1103*b* may generate a signal output in linear proportion to the input signal. A signal output from the second voltage controlled oscillator 1103*b* may be a fifth output F6_1 of the multi-frequency generator 1100.

According to an embodiment, the first frequency split 1105*a* may be positioned between the third output F5_1 and the fourth output F5_2. According to an embodiment, the third frequency split 1105*b* may be positioned between the fifth output F6_1 and the sixth output F6_2. According to an embodiment, the second frequency split 1107*a* may be positioned between the fourth output F5_2 and the first voltage converter 1101*a*. According to an embodiment, the fourth frequency split 1107*b* may be positioned between the sixth output F6_2 and the second voltage converter 1101*b*. According to an embodiment, the division ratio of the first frequency split 1105*a* may be 1/2, and the division ratio of the third frequency split 1107*a* may be 1/3. According to an embodiment, the fourth output F5_2 may be $$\frac{1}{2}\text{F5\_1}.$$

According to an embodiment, the sixth output F6_2 may be $$\frac{1}{3}\text{F6\_1}.$$

According to an embodiment, the multi-frequency generator 1100 may select two signals of the third output F5_1 output from the first voltage controlled oscillator 1103*a*, the fifth output F6_1 output from the second voltage controlled oscillator 1103*b*, the fourth output F5_2 frequency-divided according to the 1/2 division ratio of the third output, and the sixth output F6_2 frequency-divided according to the 1/3 division ratio of the fifth output according to the control signal.

According to an embodiment, the division ratio of the second frequency split 1107*a* and the fourth frequency split 1107*b* may be 1/M (where, M is a positive integer).

According to an embodiment, one of the third output F5_1 and the fourth output F5_2 may be selected as a seventh output F5, and one of the fifth output F6_1 and the sixth output F6_2 may be selected as an eighth output F6 according to the control signal. According to an embodiment, the frequency relation of the fifth output F5 and the eighth output F6 may be independent from each other.

FIG. 12 is a circuit diagram illustrating an example configuration of a reconfigure mixer (e.g., FIG. 5B), according to various embodiments. Referring to FIG. 5B, the reconfigure mixer 513*a*, which indicates the first mixer 613, the second mixer 515*a*, and/or the first mixer 713, may be the internal circuitry of the first mixer 613, the second mixer 515*a*, and/or the first mixer 713.

Referring to FIG. 12, the internal circuit 1200 of the reconfigure mixer may include a first differential amplifier 1201*a*, a second differential amplifier 1201*b*, a first digital logic circuit 1203*a*, a second digital logic circuit 1203*b*, a first NOTGATE 1205, a second NOTGATE 1207, a fifth n-type metal oxide semiconductor field effect transistor (MOSFET) 1207*a*, and/or a sixth n-type MOSFET 1207*b*.

According to an embodiment, the first differential amplifier 1201*a* may include a first n-type MOSFET 1201*a*-1, and/or a second n-type MOSFET 1201*a*-2. As another example, the second differential amplifier may include a third n-type MOSFET 1201*b*-1, and/or a fourth n-type MOSFET 1201*b*-1.

According to an embodiment, a drain of the second n-type MOSFET 1201*a*-2 included in the first differential amplifier 1201*a* may be electrically connected to a drain terminal of the fourth n-type MOSFET 1201*b*-2 of included in the second differential amplifier 1201*b*. A drain of the third n-type MOSFET 1201*b*-1 included in the second differential amplifier 1201*b* may be electrically connected to a drain terminal of the first n-type MOSFET 1201*a*-1 of included in the first differential amplifier 1201*b*.

According to an embodiment, a first input F6 input to the internal circuit 1200 of the reconfigure mixer may be input to gate terminals of the first n-type MOSFET 1201*a*-1 included in the first differential amplifier 1201*a*, and the fourth n-type MOSFET 1201*b*-2 included in the second differential amplifier 1201*b*.

According to an embodiment, the first input F6 may be input to the gate terminals of the first n-type MOSFET 1201*a*-2 included in the first differential amplifier 1201*a*, and the fourth n-type MOSFET 1201*b*-1 included in the second differential amplifier 1201*b* by way of the first NOTEGATE 1205.

According to an embodiment, source terminals of the first n-type MOSFET 1201*a*-1 and the second n-type MOSFET 1201*a*-1 included in the first differential amplifier 1201*a* may be connected to the first logic circuit 1203*a* via the fifth n-type MOSFET 1207*a*. Source terminals of the third n-type MOSFET 1201*b*-1 and the fourth n-type MOSFET 1201*b*-1 included in the second differential amplifier 1201*b* may be connected to the second logic circuit 1203*b* via the sixth n-type MOSFET 1207*b*.

According to an embodiment, a second input F7 input to the internal circuit 1200 of the reconfigure mixer may be connected to the first digital logic circuit 1203*a*, and connected to the second digital logic circuit 1203*b* via the second NOTGATE 1207.

Based on this structure, the first output F1 and the second output F2 of the multi-frequency generator 511*a* of FIG. 5A may be input to the first input F6 and the second input F7 respectively.

According to various embodiments of the present disclosure, the internal circuit 1200 of the reconfigure mixer adds the digital logic circuit to a general Gilber-cell mixer and the signal input to the internal circuit 1200 of the reconfigure mixer may be selected to one of the second input F7, a DC bias, or a GND according to an external control signal to thus change an operation mode.

The operation mode may include a general use mode, a built-in-self-test (BIST) mixer mode, or a BIST buffer mode. The general use mode may input the LO frequency signal to the first input F6 and the IF signal to the second input F7 and output a signal of the combined frequency of the LO frequency and the IF frequency at the OUT stage. The BIST mixer mode may input the second input F2 of the multi-frequency generator 1010 instead of the IF signal to the second input F7 in the general use mode and output the F6+F7 frequency signal at the OUT stage. The embodiments shown in FIG. 6 through FIG. 9 show the operation in the BIST mixer mode of the operation modes. The BIST buffer mode may turn off a first digital logic circuit 1303*a* by applying the DC bias to the first digital logic circuit 1303*a* and the GND to a second digital logic circuit 1303*b* and amplify and output only the F6 signal at the OUT stage. For example, it may operate as the buffer of the signal having the F6 frequency rather than the mixer.

According to the present disclosure, the RF signal FRF and the IF signal FIF generated according to the operation conditions of the multi-frequency generator 511*a* and the reconfigure mixer 513*a* of FIG. 5A to obtain the intended output frequency are summarized as follows.

A. If the multi-frequency generator and the reconfigure mixer based on one voltage controlled oscillator of FIG. 6 or FIG. 7 are combined:

(1) FRF frequency:

$$F1+\frac{1}{2}F1,$$

$$\frac{1}{2}F1$$

(2) FRF frequency:

$$F1+\frac{1}{3}F1,$$

FIF frequency:

$$\frac{1}{3}F1$$

(3) FRF frequency: F1, FIF frequency:

$$F1-\frac{1}{2}F1$$

(4) FRF frequency: F1, FIF frequency:

$$F1-\frac{1}{3}F1$$

B. If the multi-frequency generator and the reconfigure mixer based on two voltage controlled oscillators of FIG. 8 or FIG. 9 are combined:

(1) FRF frequency: F5_1+F6_1, FIF frequency: F5_1 or F6_1

(2) FRF frequency: F5_1+F6_2, FIF frequency: F6_2

(3) FRF frequency: F6_1+F5_2, FIF frequency: F5_2

(4) FRF frequency: F5_1+F6_2, FIF frequency: F5_1 or F6_1

(5) FRF frequency: F5_1, FIF frequency: F5_2 or F6_1

(6) FRF frequency: F6_1, FIF frequency: F5_2 or F5_1

The electronic device 101 may perform the failure test by generating the intended RF signal FRF and IF signal FIF through various frequency combinations as shown in the Case A and B, applying them to the equipment-less module inspection system 400 shown in FIG. 4 and thus generating the signal for the self-testing by itself.

According to an embodiment of the present disclosure, an antenna module 600, 700, 800 and 900 may be configured to include at least one transmission chain including a first mixer 613 and 713 which up-converts a transmission signal into a radio frequency band; at least one frequency generator 611, 711, 811*a*, 811*b*, 911*a*, and 911*b* configured to generate at least one signal; and at least one switch sw1, sw2, sw3, sw4, sw5, sw6, sw7, and sw8 for receiving the at least one signal generated from the frequency generator 611, 711, 811*a*, 811*b*, 911*a*, and 911*b*, and switching to selectively deliver the at least one signal to the first mixer 613 and 713.

According to an embodiment, the first mixer 613 may be configured to include a first port 613-1, a second port 613-2, and a third port 613-3, the at least one frequency generator 613 may be configured to include a first input stage 611-1 for receiving a reference clock, and a first output stage 611-2 and a second output stage 611-3 which output signals of different frequency bands, and the at least one switch may be configured to include a first switch sw2 positioned on a path interconnecting the first output stage 611-2 and the first port 613-2, a second switch sw1 positioned on a path interconnecting the second output stage 611-3 and the second port 613-2, and a third switch sw3 positioned on a path interconnecting an input unit 619 to which the reference clock is input and the first input stage 611-1.

According to an embodiment, the antenna module 700 may be configured to include a first split/combiner 521*a*, the at least one frequency generator 711 may be configured to include a first input stage 711-1 to which a reference clock is input, and a first output stage 711-3, and the at least one switch may be configured to include a first switch sw1 positioned on a path interconnecting the first output stage 711-3 and the first split/combiner 521*a*, and a second switch sw3 positioned on a path interconnecting an input unit 619 to which the reference clock is input and the first input stage 711-1.

According to an embodiment, the antenna module may be configured to include a second mixer 515*a* including a fourth port 515*a*-2, the at least one frequency generator may be configured to include a first frequency generator 811*a*, and a second frequency generator 811*b*, the first frequency generator 811*a* may be configured to include a first output stage 811*a*-1 and a first input stage 811*a*-2, the second frequency generator 811*b* may be configured to include a second output stage 811*b*-2 and a second input stage 811*b*-1, the first mixer 613 may be configured to include a first port 613-1, a second port 613-2, and a third port 613-3, and the at least one switch may be configured to include a first switch sw1 positioned on a path interconnecting the second port 613-2 and the first output stage 811*a*-1, a second switch sw3 positioned on a path interconnecting the fourth port 515*a*-2 and the first output stage 811*a*-1, and a third switch sw6 positioned on a path interconnecting a common path of the first input stage 811*a*-2 and the second input stage 811*b*-1 and an input unit 619 to which the reference clock is input.

According to an embodiment, the antenna module 900 may be configured to include a first split/combiner 521*a*, and a second mixer 515*a* including a first port 515*a*-2, the at least one frequency generator may be configured to include a first frequency generator 911*a*, and a second frequency generator 911*b*, the first frequency generator 911*a* may be configured to include a first output stage 911*a*-1 and a first input stage 911*a*-2, the second frequency generator 911*b* may be configured to include a second output stage 911*b*-1 and a second input stage 911*b*-2, and the at least one switch may be configured to include a first switch sw1 positioned on a path interconnecting the first output stage 911*a*-1 and the first split/combiner 521*a*, a second switch sw5 positioned on a path interconnecting the second output stage 911*b*-1 and the first port 515*a*-2, and a third switch sw6 positioned on a path interconnecting an input unit 619 to which the reference clock is input and a common path of the first input stage 911*a*-2 and the second input stage 911*b*-2.

According to an embodiment, the at least one frequency generator 911 may be configured to generate a signal FLO_1 having an LO frequency and a signal FIF_1 having an IF.

According to an embodiment, the at least one frequency generator 711 may be configured to generate a signal FRF_2 having an RF frequency and a signal FLO_2 having an LO frequency.

According to an embodiment, the first frequency generator 811*a* may be configured to generate a signal FLO_3 having an LO frequency, and the second frequency generator 811*b* may be configured to generate a signal FIF_4 having an IF.

According to an embodiment, the first frequency generator 911*a* may be configured to generate a signal FRF_4 having an RF, and the second frequency generator 911*b* may be configured to generate a signal FLO_4 having an LO.

According to an embodiment, the antenna module 600, 700, 800, and 900 may be configured to include an antenna element 565*a* including a first feed point 561*a* and a second feed point 563*a*, and the first feed point 561*a* and the second feed point 563*a* may be configured to be orthogonal to each other.

According to an example embodiment of the present disclosure, an electronic device may include: an antenna element including a first feed point; at least one transmission chain electrically coupling with the first feed point, and including a first mixer configured to up-convert a transmission signal into a radio frequency band; at least one frequency generator configured to generate at least one signal; and at least one switch configured to receive the generated at least one signal from the frequency generator, and to selectively deliver the at least one signal to the first mixer.

According to an example embodiment, the first mixer may include a first port, a second port and a third port, the at least one frequency generator may include a first input stage configured to receive a reference clock, and a first output stage and a second output stage configured to output signals of different frequency bands, and the at least one switch include a first switch positioned on a path interconnecting the first output stage and the first port, a second switch positioned on a path interconnecting the second output stage and the second port, and a third switch positioned on a path interconnecting an input to which the reference clock is input and the first input stage.

According to an example embodiment, the electronic device may include a first split/combiner, the at least one frequency generator may include a first input stage to which a reference clock is input, and a first output stage, and the at least one switch may include a first switch positioned on a path interconnecting the first output stage and the first split/combiner a, and a second switch positioned on a path interconnecting an input to which the reference clock is input and the first input stage.

According to an example embodiment, the electronic device may include a second mixer including a fourth port, the at least one frequency generator may include a first frequency generator, and a second frequency generator, the first frequency generator may include a first output stage and a first input stage, the second frequency generator may include a second output stage and a second input stage, the first mixer may include a first port, a second port, and a third port, and the at least one switch may include a first switch positioned on a path interconnecting the second port and the first output stage, a second switch positioned on a path interconnecting the fourth port and the first output stage, and a third switch positioned on a path interconnecting a common path of the first input stage and the second input stage and an input to which the reference clock is input.

According to an example embodiment, the electronic device may include a first split/combiner, and a second mixer including a first port, the at least one frequency generator may include a first frequency generator, and a second frequency generator, the first frequency generator may include a first output stage and a first input stage, the second frequency generator may include a second output stage and a second input stage, and the at least one switch may include a first switch positioned on a path interconnecting the first output stage and the first split/combiner, a second switch positioned on a path interconnecting the second output stage and the first port, and a third switch positioned on a path interconnecting an input to which the reference clock is input and a common path of the first input stage and the second input stage.

According to an example embodiment, the at least one frequency generator may be configured to generate a signal having an local oscillator (LO) frequency and a signal having an intermediate frequency (IF).

According to an example embodiment, the at least one frequency generator may be configured to generate a signal having an RF frequency and a signal having an LO frequency.

According to an example embodiment, the first frequency generator may be configured to generate a signal having an LO frequency, and the second frequency generator may be configured to generate an IF signal.

According to an example embodiment, the first frequency generator may be configured to generate a signal having an RF, and the second frequency generator may be configured to generate a signal having an LO.

According to an example embodiment, a test apparatus may include an antenna element including a first feed point; an antenna module including at least one antenna electrically coupling with the first feed point; a board configured to generate a control signal to control the antenna module, and to supply the control signal and a reference clock to the antenna module; a processor configured to communicate with the board; and a power supply configured to supply power to the antenna module, wherein the antenna module may include at least one transmission chain including a first mixer configured to up-convert a transmission signal into a radio frequency band; at least one frequency generator configured to generate at least one signal; and at least one switch configured to receive the generated at least one signal from the frequency generator, and to selectively deliver the at least one signal to the first mixer.

While the disclosure has been illustrated described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents.

What is claimed is:

1. An antenna module comprising:

at least one transmission chain comprising a first mixer configured to up-convert a transmission signal into a radio frequency band, the first mixer comprising a first port, a second port, and a third port;

at least one frequency generator configured to generate at least one signal, and comprising a first input stage configured to receive a reference clock, and a first output stage and a second output stage configured to output signals of different frequency bands; and at least one switch comprising a first switch, a second switch, and a third switch, and configured to receive the at least one signal generated from the at least one frequency generator, and to selectively deliver output signal of the first output stage and output signal of the second output stage to the first port, the second port, and the third port to the first mixer.

2. The antenna module of claim 1, wherein the first switch is positioned on a path interconnecting the first output stage and the first port, the second switch is positioned on a path interconnecting the second output stage and the second port, and the third switch is positioned on a path interconnecting an input to which the reference clock is input and the first input stage.

3. An antenna module comprising:

at least one transmission chain comprising a first mixer configured to up-convert a transmission signal into a radio frequency band;

at least one frequency generator configured to generate at least one signal; and at least one switch configured to receive the at least one signal generated from the at least one frequency generator, and to selectively deliver the at least one signal to the first mixer wherein the antenna module comprises a first split/combiner, the at least one frequency generator comprises a first input stage configured to receive a reference clock, and a first output stage, and the at least one switch comprises, a first switch positioned on a path interconnecting the first output stage and the first split/combiner, and a second switch positioned on a path interconnecting an input to which the reference clock is input and the first input stage.

4. The antenna module of claim 1, wherein the antenna module comprises a second mixer comprising a fourth port, the at least one frequency generator comprises a first frequency generator, and a second frequency generator, the first frequency generator comprises the first output stage and the first input stage, the second frequency generator comprises the second output stage and a second input stage, the first switch is positioned on a path interconnecting the second port and the first output stage, the second switch is positioned on a path interconnecting the fourth port and the first output stage, and the third switch is positioned on a path interconnecting a common path of the first input stage and the second input stage and an input to which the reference clock is input.

5. The antenna module of claim 3, wherein the antenna module comprises a second mixer comprising a first port, the at least one frequency generator comprises a first frequency generator, and a second frequency generator, the first frequency generator comprises the first output stage and the first input stage, the second frequency generator comprises a second output stage and a second input stage, and the at least one switch comprises:

a third switch positioned on a path interconnecting the second output stage and the first port, and a fourth switch positioned on the path interconnecting the input to which the reference clock is input and a common path of the first input stage and the second input stage.

6. The antenna module of claim 2, wherein the at least one frequency generator is configured to generate a signal having a local oscillator (LO) frequency and a signal having an intermediate frequency (IF).

7. The antenna module of claim 3, wherein the at least one frequency generator is configured to generate a signal having a radio frequency (RF) and a signal having a local oscillator (LO) frequency.

8. The antenna module of claim 4, wherein the first frequency generator is configured to generate a signal having a local oscillator (LO) frequency, and the second frequency generator is configured to generate a signal having an intermediate frequency (IF).

9. The antenna module of claim 5, wherein the first frequency generator is configured to generate a signal having a radio frequency (RF), and the second frequency generator is configured to generate a signal having a local oscillator (LO).

10. The antenna module of claim 1, wherein the antenna module comprises:

an antenna element comprising a first feed point and a second feed point, wherein the first feed point and the second feed point are orthogonal to each other.

11. An electronic device comprising:

an antenna element comprising a first feed point;

at least one transmission chain electrically coupling with the first feed point, and comprising a first mixer configured to up-convert a transmission signal into a radio frequency band, the first mixer comprising a first port, a second port, and a third port;

at least one frequency generator, comprising circuitry, configured to generate at least one signal, and comprising a first input stage configured to receive a reference clock, and a first output stage and a second output stage configured to output signals of different frequency bands; and at least one switch comprising a first switch, a second switch, and a third switch, and configured to receive the generated at least one signal from the at least one frequency generator, and to selectively deliver output signal of the first output stage and the output signal of the second output stage to the first port, the second port, and the third port of the first mixer.

12. The electronic device of claim 11, wherein the first switch is positioned on a path interconnecting the first output stage and the first port, the second switch is positioned on a path interconnecting the second output stage and the second port, and the third switch is positioned on a path interconnecting an input to which the reference clock is input and the first input stage.

13. An electronic device comprising:

an antenna element comprising a first feed point;

at least one transmission chain electrically coupling with the first feed point, and comprising a first mixer configured to up-convert a transmission signal into a radio frequency band;

at least one frequency generator, comprising circuitry, configured to generate at least one signal;

at least one switch configured to receive the generated at least one signal from the at least one frequency generator, and to selectively deliver the at least one signal to the first mixer; and a first split/combiner, wherein the at least one frequency generator comprises a first input stage to which a reference clock is input, and a first output stage, and the at least one switch comprises:

a first switch positioned on a path interconnecting the first output stage and the first split/combiner, and a second switch positioned on a path interconnecting an input to which the reference clock is input and the first input stage.

14. The electronic device of claim 11, wherein the electronic device comprises a second mixer comprising a fourth port, the at least one frequency generator comprises a first frequency generator, and a second frequency generator, the first frequency generator comprises the first output stage and the first input stage, the second frequency generator comprises the second output stage and a second input stage, the first switch is positioned on a path interconnecting the second port and the first output stage, the second switch is positioned on a path interconnecting the fourth port and the first output stage, and the third switch is positioned on a path interconnecting a common path of the first input stage and the second input stage and an input to which the reference clock is input.

15. The electronic device of claim 13, wherein the electronic device comprises a second mixer comprising a first port, the at least one frequency generator comprises a first frequency generator, and a second frequency generator, each comprising circuitry, the first frequency generator comprises the first output stage and the first input stage, the second frequency generator comprises a second output stage and a second input stage, and the at least one switch comprises:

a third switch positioned on a path interconnecting the second output stage and the first port, and a fourth switch positioned on the path interconnecting the input to which the reference clock is input and a common path of the first input stage and the second input stage.

16. The electronic device of claim 12, wherein the at least one frequency generator is configured to generate a signal having a local oscillator (LO) frequency and a signal having an intermediate frequency (IF).

17. The electronic device of claim 13, wherein the at least one frequency generator is configured to generate a signal having a radio frequency (RF) and a signal having a local oscillator (LO) frequency.

18. The electronic device of claim 14, wherein the first frequency generator is configured to generate a signal having a local oscillator (LO) frequency, and the second frequency generator is configured to generate a signal having an intermediate frequency (IF).

19. The electronic device of claim 15, wherein the first frequency generator is configured to generate a signal having a radio frequency (RF), and the second frequency generator is configured to generate a signal having a local oscillator (LO).

20. A test apparatus, comprising an antenna element comprising a first feed point;

an antenna module including an antenna electrically coupling with the first feed point;

a board configured to generate a control signal to control the antenna module, and to supply the control signal and a reference clock to the antenna module;

a process personal computer (PC) configured to communicate with the board; and a power supply configured to supply power to the antenna module, wherein the antenna module comprises, at least one transmission chain comprising a first mixer configured to up-convert a transmission signal into a radio frequency band, the first mixer comprising a first port, a second port, and a third port;

at least one frequency generator, comprising circuitry, configured to generate at least one signal, and comprising a first input stage configured to receive the reference clock, and a first output stage and a second output stage configured to output signals of different frequency bands; and at least one switch comprising a first switch, a second switch, and a third switch, and configured to receive the generated at least one signal from the at least one frequency generator, and to selectively deliver the output signal of the first output stage and the output signal of the second output stage to the first port, the second port, and the third port of the first mixer.

* * * * *